(12) United States Patent
Wakabayashi et al.

(10) Patent No.: US 8,123,494 B2
(45) Date of Patent: Feb. 28, 2012

(54) ROLLING BEARING UNIT FOR SUPPORTING A WHEEL WITH AN AIR COMPRESSOR

(75) Inventors: Tatsuo Wakabayashi, Kanagawa (JP); Yoshihiro Kanayama, Kanagawa (JP)

(73) Assignee: NSK Ltd., Tokyo (JP)

( * ) Notice: Subject to any disclaimer, the term of this patent is extended or adjusted under 35 U.S.C. 154(b) by 1284 days.

(21) Appl. No.: 11/517,535

(22) Filed: Sep. 7, 2006

(65) Prior Publication Data
US 2008/0006357 A1 Jan. 10, 2008

(30) Foreign Application Priority Data

Jun. 28, 2006 (JP) ................................ 2006-177501
Aug. 10, 2006 (JP) ................................ 2006-217709

(51) Int. Cl.
*F04B 17/06* (2006.01)
*F04B 35/06* (2006.01)
(52) U.S. Cl. ........ 417/233; 417/273; 152/418; 152/419; 152/426
(58) Field of Classification Search ............... 417/233, 417/219–220, 273; 152/415, 418–422; 91/498
See application file for complete search history.

(56) References Cited

U.S. PATENT DOCUMENTS

| | | | | | |
|---|---|---|---|---|---|
| 1,058,141 | A | * | 4/1913 | Bergstrom | 417/233 |
| 1,423,607 | A | * | 7/1922 | Groat | 417/233 |
| 1,885,284 | A | * | 11/1932 | Otto | 152/421 |
| 1,887,715 | A | * | 11/1932 | Hester | 417/233 |
| 2,127,152 | A | * | 8/1938 | Boone | 417/233 |
| 2,319,718 | A | * | 5/1943 | Brooks | 417/273 |
| 2,415,618 | A | * | 2/1947 | West | 417/498 |
| 2,506,677 | A | * | 5/1950 | McKenna | 152/422 |
| 2,977,891 | A | * | 4/1961 | Bishop | 91/485 |
| 3,058,429 | A | * | 10/1962 | Rocheville | 91/495 |
| 3,452,801 | A | * | 7/1969 | Fletcher et al. | 152/419 |

(Continued)

FOREIGN PATENT DOCUMENTS

JP   45-20471   7/1970

(Continued)

OTHER PUBLICATIONS

Japanese Office Action dated Sep. 6, 2011, from corresponding Japanese Application No. 2006-217709.

*Primary Examiner* — Charles Freay
*Assistant Examiner* — Christopher Bobish
(74) *Attorney, Agent, or Firm* — Katten Muchin Rosenman LLP

(57) ABSTRACT

A wheel-supporting roller-bearing unit with air compressor that is compact and capable of keeping resistance against the rotation of the hub 4c low while at the same time maintaining good balance, and when necessary, is capable of obtaining compressed air having sufficient pressure regardless of the traveling speed of the vehicle. A plurality of cylinder holes 53 are located at a plurality of locations that are evenly spaced around the circumferential direction on the inside of a cylinder block 50 that is connected and fastened to the inside end section in the axial direction of the hub 4c. Pistons 54 fit inside these cylinder holes 53 and are moved back and forth by a piston-drive mechanism 62 as the cylinder block 50 rotates. The air compressor 2c is a reciprocating-piston compressor, so it is possible to obtain the required air pressure regardless of rpm. Also, by placing a plurality of cylinder holes 53 and pistons 54 at uniform intervals around in the circumferential direction, it is possible to suppress the resistance against the rotation of the hub 4c.

8 Claims, 22 Drawing Sheets

U.S. PATENT DOCUMENTS

| | | | | |
|---|---|---|---|---|
| 3,947,164 A | * | 3/1976 | Stocker | 418/233 |
| 3,968,734 A | * | 7/1976 | Rutz | 91/491 |
| 4,634,349 A | * | 1/1987 | Abe et al. | 417/219 |
| 4,697,991 A | * | 10/1987 | Tsukahara et al. | 417/219 |
| 5,011,233 A | * | 4/1991 | Nomura et al. | 301/108.1 |
| 5,591,281 A | * | 1/1997 | Loewe | 152/418 |
| 5,947,696 A | * | 9/1999 | Baumgarten | 417/233 |
| 7,603,941 B2 | | 10/2009 | Lemaire et al. | |
| 2006/0002802 A1 | * | 1/2006 | Lemaire et al. | 417/273 |
| 2006/0274983 A1 | * | 12/2006 | Takahashi et al. | 384/448 |
| 2008/0003110 A1 | * | 1/2008 | Isono | 417/233 |

FOREIGN PATENT DOCUMENTS

| | | |
|---|---|---|
| JP | 62-4617 | 1/1987 |
| JP | 2006-504895 | 2/2006 |
| WO | 2004040132 | 5/2004 |

\* cited by examiner (A)

(B)

ROLLING BEARING UNIT FOR SUPPORTING A WHEEL WITH AN AIR COMPRESSOR

BACKGROUND OF THE INVENTION

1. Field of the Invention

This invention relates to a wheel-supporting rolling bearing unit with air compressor, which is used for supporting an automobile wheel so that it can rotate freely with respect to the suspension apparatus, and that properly maintains air pressure in the tires of the wheel.

2. Description of the Prior Art

There is a proper value for the air-pressure in the tires of automobile wheels, however, this air pressure gradually decreases due to leaking and varies due to the outside air temperature. In other words, the gas barrier of the rubber material of the tires is not perfect, and there is also a possibility that leaking from the valve section of the air-supply section may become greater than leaking through the rubber material. Moreover, as is clear from Boyle's Law and Charles's Law, even when leakage is ignored, the air pressure fluctuates 10% or more in the summer and winter, even though the rise in temperature due to movement of the vehicle is ignored, and when taking into consideration the rise in temperature due to the vehicles movement, the air pressure may fluctuate 30% or more. However, except for the case of commercial vehicles such as trucks, busses, taxis and the like, there are very few drivers who constantly check the air pressure.

Taking into consideration this situation, in the case of a typical driver of a private vehicle, it is common at the time of required vehicle inspection to set the air pressure of all of the wheels to a value higher than the proper value. The reason for this is that the air pressure of each of the wheels will decrease somewhat due to leaking that occurs until the next required vehicle inspection, and this is thought to make it more difficult for dangerous conditions such as bursting to occur when driving at high speed even though the driver does not maintain the air pressure. However, in this situation, the air pressure of each of the wheels is set higher than the proper value, which together with making riding comfort of the automobile poor, adversely affects driving stability and brake performance of the automobile. Particularly, this tendency becomes more severe when regular vehicle inspection is performed in a season such as the beginning of spring when the outside temperature begins to increase. In recent years, leakage of air is kept to a minimum by changing the gas used to fill the wheels from air to nitrogen gas that does not contain other gasses such as oxygen; however, it is still difficult to completely eliminate leaking.

Also, in order to improve vehicle performance such as comfort, driving stability and braking, it is preferable that the air pressure be adjusted according the road conditions. In other words, in order to improve the aforementioned vehicle performance when driving on a poor road such as a gravel or dirt road, it is preferable that the air pressure be set lower than when driving on a good paved road. However, even when the air pressure has been set lower for driving on a poor road, when driving particularly at high speed on a good paved road after that, the air pressure must be increased, so it is necessary to fill each of the wheels with air. Moreover, the same problem occurs when considering that the wheels must be filled with air again after the temperature has decreased after lowering the air pressure of the wheels that has greatly increased due to rising temperature when driving during the summer. However, having to stop the car to fill the wheels with air with a separate air compressor every time the road conditions change, or every time the driving conditions or temperature changes is not practical. Therefore, in order to meet the needs described above, it is necessary that each of the wheels be constructed so that they can be filled with air while driving the automobile.

Construction that meets the aforementioned needs is known, for example, the construction disclosed in patent documents 1 to 9. Of the construction disclosed in these patents, the construction disclosed in patent documents 1 to 7 presumes that a supply source for compressed air, such as an air compressor, is built into the vehicle body side. Also, the compressed air that is supplied from this supply source via the suspension apparatus to the inside of the stationary side of the bearing ring, is fed to the rotating side of the bearing ring via a sealed space that is partitioned by a seal ring, and furthermore is supplied to the wheel that is fastened to the rotating side of the bearing ring. Moreover, with the construction that is disclosed in patent document 8, a reciprocating-piston air compressor is fastened to the hub that rotates with the wheels of a large automobile such as a truck in the axial direction of the hub. Furthermore, with the construction disclosed in patent document 9, a reciprocating-piston air compressor is fastened to the hub that rotates with the wheels of a bicycle in the axial direction of the hub. In the case of the construction disclosed in either patent document 8 or patent document 9, compressed air that is output from the air compressor is supplied to the wheels.

Of the construction disclosed in patent documents 1 to 9 described above, in the case of the construction disclosed in patent documents 1 to 7, in order to feed compressed air from the air compressor located on the vehicle body side to the wheels that are fastened to the rotating side of the bearing ring, a complex air-supply path is necessary. In order to always maintain the air pressure in the tires at a proper pressure, it is necessary to maintain the seal of this air-supply path even after use over a long period of time, which results in increased cost.

On the other hand, in the case of the construction disclosed in patent documents 8 and 9, instead of the above problem, a single reciprocating-piston air compressor is located next to the hub, so in order to maintain the necessary amount of compressed air it is necessary to use a large compressor for this air compressor. By placing a somewhat large reciprocating-piston air compressor in the axial direction of the hub in this way, the overall wheel-supporting rolling bearing unit with air compressor becomes large. Also, in the reciprocating-piston air compressor, the force required for moving the piston through one cycle greatly fluctuates, so when driving a single reciprocating-piston air compressor together with the rotation of the hub, the rotation friction of this hub greatly fluctuates through one rotation. From the aspect of maintaining the driving stability of an automobile in which this kind of wheel-supporting rolling bearing unit with air compressor is installed, this kind of condition is not desirable.

[Patent Document 1]
Japanese Patent No. 2,540,745
[Patent Document 2]
Japanese Patent No. 2,940,105
[Patent Document 3]
U.S. Pat. No. 5,203,391
[Patent Document 4]
Japanese Patent Application Publication No. 2000-255228
[Patent Document 5]
US Patent Application Publication No. 2003/0217798
[Patent Document 6]
US Patent Application Publication No. 2003/0235358

[Patent Document 7]
US Patent Application Publication No. 2004/0005104
[Patent Document 8]
Japanese Patent Application Publication No. H11-139118
[Patent Document 9]
Japanese Patent Application Publication No. 2004-136797

SUMMARY OF THE INVENTION

Taking the aforementioned problems into consideration, it is an object of the present invention to provide a wheel-supporting rolling bearing unit with air compressor that is compact and is capable of keeping resistance against hub rotation to a minimum with good balance. Furthermore, another object of the present invention is to provide a wheel-supporting rolling bearing unit with air compressor having construction that is capable when required of maintaining necessary pressure during travel at low speed.

The wheel-supporting rolling bearing unit with air compressor of this invention comprises: a wheel-supporting rolling bearing unit, an air compressor, and a feed path. Of these, the wheel-supporting rolling bearing unit comprises: an outer ring member having a double row of outer raceways formed on an inner peripheral surface thereof; an inner ring member having a double row of inner raceways formed on an outer peripheral surface thereof; and a plurality of rolling elements located between the inner raceways and outer raceways. Also, one of either the outer ring member or inner ring member is a stationary ring that is supported by and fastened to a suspension apparatus and does not rotate during use, and the other member is a hub that is fastened to the wheel and rotates together with the wheel.

Moreover, the air compressor is driven by the rotation of the hub, and compresses air that is drawn in from the outside, after which it discharges the compressed air.

Furthermore, the feed path feeds the compressed air that is discharged from the air compressor toward the tire of the wheel.

In embodying the wheel-supporting rolling bearing unit with air compressor of this invention, the air compressor may be a rotary air compressor, for example. This rotary air compressor is located between the inner peripheral surface on the inside end section in the axial direction of the outer ring member and the outer peripheral surface on the inside end section in the axial direction of the inner ring member. More preferably, an eccentric ring, whose center axis of its inner peripheral surface does not coincide with the center axis of its outer peripheral surface, is located between the peripheral surface (for example the inner peripheral surface) of the rotor of the rotary air compressor that rotates together with the hub and the peripheral surface of the hub (for example the outer peripheral surface). Also, this eccentric ring can rotate relative to the rotor.

Alternatively, when embodying the wheel-supporting rolling bearing unit with air compressor of this invention, the air compressor may be a scroll air compressor, for example. This scroll air compressor is located between an interior surface of a cover that is supported by and fastened to the inside end section in the axial direction of the outer ring and the inside end surface in the axial direction of the hub.

In the case of the wheel-supporting rolling bearing unit with air compressor of this invention, the outer ring member may by an outer ring having double row outer raceways formed on an inner peripheral surface thereof, which is supported by and fastened to the suspension apparatus and does not rotate during use; and the inner ring member may be a hub having double row inner raceways formed on an outer peripheral surface thereof, which rotates together with the wheel during use.

Also, the air compressor of one embodiment of this kind of wheel-supporting rolling bearing unit with air compressor comprises: a cylinder block, a plurality of cylinder holes, a plurality of pistons, a piston-drive mechanism and an air-intake path.

Of these, the cylinder block is connected and fastened to the inside end section in the axial direction of the hub so that it is concentric with the hub.

Also, the cylinder holes are formed at a plurality of locations evenly spaced in the circumferential direction of the cylinder block so that they are oriented in the radial direction of the cylinder block and open on the outer peripheral surface of the cylinder block.

The pistons are fitted into the cylinder holes in airtight manner and are such that they can move inside the cylinder holes in the radial direction of the cylinder block.

The piston-drive apparatus is such that at least part of the components are located between the pistons and a member fastened to the outer ring. The piston-drive mechanism moves the pistons back and forth in the radial direction of the cylinder block as the cylinder block rotates.

On the other hand, another embodiment of the air compressor comprises: a plurality of cylinders, a plurality of pistons, a piston-drive mechanism and an air-intake path.

Of these, the cylinders are supported by and fastened to a plurality of locations that are evenly spaced in the circumferential direction around the inside end section in the axial direction of the hub so that the center axes of the cylinders are at an angle with respect to the radial direction of the hub, or in other words, are in a tangential direction or near a tangential direction.

The pistons are fitted into the cylinders in airtight manner and are such that they can slide back and forth in the axial direction of the cylinders.

Also, the piston-drive mechanism is formed between the respective pistons and a member fastened to the outer ring. The piston-drive mechanism moves the pistons back and forth inside the cylinders as the cylinders rotate (revolve around the center axis of the hub).

In either embodiment, the air-intake path is formed between the outside space and the back section of the cylinder holes or cylinders. Also, the air-intake path draws in air from the outside space to the back sections of the cylinder holes or cylinders when the pistons move outward in the radial direction of the cylinder block, or move toward the opening sections of the cylinders.

Furthermore, in either embodiment, a feed path is formed between a discharge port that is formed in part of the hub and the back sections of each of the cylinder holes or cylinders. The feed path feeds compressed air from the back sections of the cylinder holes or cylinders to the discharge port when the pistons move inward in the radial direction of the cylinder block, or move toward the back sections of the cylinders.

In the case of the wheel-supporting rolling bearing unit with air compressor of this invention, it is preferable that there be an independent air-intake path for each cylinder hole or each cylinder. Also, air-intake check valves are located in the middle of each air-intake path so that they are in line with the air-intake paths and allow air to pass only in the direction from the outside space toward the cylinder holes or cylinders. Moreover, there are independent upstream portions of the feed path for each cylinder hole or cylinder that come together at a downstream portion and flow to a single discharge port. Also, there are discharge check valves located in the middle of the upstream portions of the feed path so that they are in line with the upstream portions and allow compressed air to flow only in the direction from the cylinder holes or cylinders toward the discharge port.

When implementing the one embodiment of the wheel-supporting rolling bearing unit with air compressor described above, for example, the member fastened to the outer ring and is between the pistons where part of the components of the piston-drive apparatus are installed is a cover that is fastened to the inside end section in the axial direction of the outer ring and covers the opening section on the inside end in the axial direction of the outer ring. Also, a cylindrical section that is eccentric with respect to the outer ring and cylinder block is located on a part of the cover that is adjacent to the inside in the axial direction of the inside end surface in the axial direction of the outer ring. Moreover, the inner peripheral surface of this cylindrical section engages with the base end surfaces of the respective pistons, which are the end surfaces on the outer side in the radial direction of the outer ring and cylinder block, by way of a bearing. This construction forms a pushing mechanism that pushes the pistons inward in the radial direction of the cylinder block as the cylinder block rotates. Together with this, compression springs, which are the remaining components of the piston-drive mechanism, are located between the tip-end surfaces of the pistons, which are the end surfaces on the inner side in the radial direction of the cylinder block, and the surfaces on the back end of the cylinder holes, and they apply an elastic force on the pistons in the direction that displaces the pistons outward in the radial direction of the cylinder block.

Moreover, in the case of embodying this invention, it is preferable that a cylindrical member be placed between the inner peripheral surface of the cylindrical section located in the cover and the base end surfaces of the pistons. Also, a radial-needle bearing is located between the inner peripheral surface of the cylindrical section and the outer peripheral surface of the cylindrical member, and a sliding bearing is located between the inner peripheral surface of this cylindrical member and the base-end surfaces of the pistons.

Also, when implementing the one embodiment of the wheel-supporting rolling bearing unit with air compressor described above, for example, the member fastened to the outer ring and is between the pistons where part of the components of the piston-drive mechanism are installed is a cover that is fastened to the inside end section in the axial direction of the outer ring and covers the opening section on the inside end in the axial direction of the outer ring. A cylindrical section that is concentric with the outer ring and cylinder block is located on the part of the cover that is adjacent to the inside in the axial direction of the inside end surface in the axial direction of the outer ring. An inner eccentric ring, whose center axis of its inner peripheral surface does not coincide with the center axis of its outer peripheral surface, is located on the inner side of the cylindrical section by way of an outer eccentric ring, whose center axis of its inner peripheral surface does not coincide with the center axis of its outer peripheral surface. By engaging the inner peripheral surface of the inner eccentric ring with the base-end surfaces of the pistons, which are the end surfaces on the outer side in the radial direction of the outer ring and cylinder block, by way of a radial-needle bearing, a pushing mechanism that pushes the pistons inward in the radial direction of the cylinder block as the cylinder block rotates is formed. Together with this, the remaining components of the piston-drive mechanism are compression springs that are located between the tip-end surfaces of the pistons, which are the end surfaces on the inner side in the radial direction of the cylinder block, and the surfaces on the back end of the cylinder holes, apply an elastic force on the pistons in the direction that displaces the pistons outward in the radial direction of the cylinder block. Furthermore, the outer peripheral surface of the inner eccentric ring and the inner peripheral surface of the outer eccentric ring engage with each other by friction so that the phase in the rotational direction of the inner eccentric ring can be adjusted.

When embodying this invention, it is preferable that the amount of eccentricity, which is the offset of the center axis of the outer peripheral surface and the center axis of the inner peripheral surface, of the inner eccentric ring is equal to the amount of eccentricity of the outer eccentric ring.

Also, when implementing the one embodiment of the wheel-supporting rolling bearing unit with air compressor described above, for example, the member fastened to the outer ring and is between the pistons where the components of the piston-drive mechanism are installed is a cover that is fastened to the inside end section in the axial direction of the outer ring and covers the opening section on the inside end in the axial direction of the outer ring. Also, a cylindrical section that is eccentric with respect to the outer ring and cylinder block is located on the part of the cover that is adjacent to the inside in the axial direction of the inside end surface in the axial direction of the outer ring. Furthermore, an oscillating ring is supported on the inner side of this cylindrical section so that the center axis of the oscillating ring is parallel with the center axis of the cylinder block, and is such that it can rotate freely with respect to the cylindrical section. The portions of the base-end sections of the pistons that protrude outward in the radial direction from the outer peripheral surface of the cylinder block engage with part of the oscillating ring so that they are essentially prevented from moving in the radial direction of the oscillating ring, but are capable of moving in the circumferential direction.

Moreover, when embodying this invention, it is preferable that a radial-needle bearing be located between the inner peripheral surface of the cylindrical section and the outer peripheral surface of the oscillating ring. Also, arc-shaped long holes are located in part of the oscillating ring in the portion that faces the base-end sides of the pistons, and are such that they are long in the circumferential direction of the oscillating ring and concentric with the oscillating ring, and pins that are parallel with the center axis of the oscillating ring are located in the base-end sections of the pistons. These pins fit in the long holes with allowance so that they can move in the lengthwise direction of the long holes.

When embodying the above invention, for example, the cover covers the entire opening on the inside end in the axial direction of the outer ring, and there is an intake opening on part of the cover for drawing in air from the outside space into the cover. Also, there is at least an air filter or a ventilator located in this intake opening.

On the other hand, when implementing the other embodiment of the wheel-supporting rolling bearing unit with air compressor, for example, the portion fastened to the outer ring and is between the pistons where the components of the piston-drive mechanism are installed is a cover that is fastened to the inside end section in the axial direction of the outer ring and covers the opening section on the inside end in the axial direction of the outer ring. Also, a cylindrical section that is eccentric with respect to the outer ring is located on the part of the cover that is adjacent to the inside in the axial direction of the inside end surface in the axial direction of the outer ring. Furthermore, an oscillating ring is supported inside the cylindrical section so that the center axis of the oscillating ring is parallel with the center axis of the outer ring, and so that oscillating ring can freely rotate with respect to the cylindrical section.

Also, in part of each piston there is one end section of a first link arm, and in part of the portion that rotates together with the hub in the portion that faces the opening section of the cylinders there is one end section of a second link arm, and each freely rocks back and forth around a respective first and second pivot that are parallel with the center axis of the outer ring. Furthermore, the other end sections of the first and second link arms and one end section of a third link arm are linked by a third pivot that is parallel to the first and second pivots so that they can freely rock back and forth, and the other end section of the third link arm is linked to part of the oscillating ring by a fourth pivot that is parallel to the first through third pivots so that it can freely rock back and forth. With this construction, a toggle mechanism is formed in which the oscillating motion of the oscillating ring in the radial direction of the outer ring is transmitted to the third pivot by way of the fourth pivot, causing the first and second link arms to expand and contract.

When embodying this invention, it is preferable that each cylinder be held in and fastened to a cylinder holder that has an outward facing flange-shape inner rim section and that is fitted around the inside end in the axial direction of the hub. Also, one end section of the second link arm pivots on this inner rim section by way of the second pivot. Moreover, the other end section of the third link arm pivots on an inward facing flange-shaped outer rim section that is located on the oscillating ring by way of the fourth pivot.

EFFECT OF THE INVENTION

The wheel-supporting rolling bearing unit with air compressor of this invention is compact and is capable of keeping the resistance against the rotation of the hub low while at the same time maintaining good balance.

Furthermore, when necessary, it is capable of obtaining compressed air having sufficient pressure regardless of the traveling speed of the vehicle. In other words, in the embodiment of the invention in which a plurality of cylinder holes or cylinders are located at a plurality of locations evenly spaced in the circumferential direction, it is possible to increase the overall capacity of the cylinder holes or cylinders even though the capacity of each cylinder hole or cylinder is decreased, and thus it is possible to maintain the required amount of compressed air that is obtained during one rotation of the hub.

Also, the instant when the force required to displace the pistons inside the cylinder holes or cylinders in the axial direction becomes large shifts in the rotational direction of the hub for each individual cylinder hole or cylinder. Therefore, it is possible to keep the amount that the resistance against the rotation of the hub fluctuates due to the rotation position of the hub low, and it is possible to keep this resistance low with good balance.

Also, in the construction of this embodiment, compressed air is generated by a reciprocating-piston air compressor, so unlike in the case of a rotary or scroll compressor, the pressure of the obtained compressed air is constant and not affected by the rotation speed of the hub. The amount of discharge is proportional to the rotation speed of the hub. Therefore, it is possible to obtain compressed air with steady pressure regardless of fluctuation in the traveling speed of the vehicle.

Moreover, individual cylinder holes or cylinders are compact, so it becomes easy to design the cylinder holes or cylinders so that they can be installed in the limited space inside or near the wheel-supporting rolling bearing unit, and thus it is possible to make a compact and lightweight wheel-supporting rolling bearing unit with air compressor.

The wheel-supporting rolling bearing unit with air compressor becomes the so-called unsprung load that exists further on the road side than a spring which constitute the suspension apparatus, so making the construction lightweight helps in maintaining the driving performance, such as the riding comfort and driving stability, of the vehicle.

Also, in the one embodiment of the wheel-bearing rolling bearing unit with air compressor of this invention, by having an independent air-intake check valve located in each independent air-intake path, and discharge check valves located in each independent upstream portion of the feed path, it is possible to make the individual cylinder holes or cylinders and pistons compact, and to employ construction for efficiently feeding compressed air. In other words, as in a typical air compressor, the air-intake and discharge check valves can be located in the port sections of the individual cylinder holes or cylinders, however, by employing that kind of construction, the construction of the port sections of the individual cylinder holes and cylinders becomes complex and large. By locating the air-intake and discharge check valves in the paths, freedom in placing each check valve is improved, which is useful from the aspect of making the construction more compact and lightweight.

Moreover, compressed air can be obtained using simple construction in which a cylindrical section that is eccentric with respect to the outer ring and cylinder block is located in part of the cover that covers the opening section on the inside end in the axial direction of the outer ring, so that the inner peripheral surface of the cylindrical section engages with the base-end surfaces of the pistons by way of a bearing to form a pushing mechanism that pushes the pistons inward in the radial direction of the cylinder block as the cylinder block rotates, and compression springs that are placed between the tip-end surface of the pistons and the back-end surface of the cylinder holes to form a mechanism that applies elastic force on the pistons in a direction that moves them outward in the radial direction of the cylinder block. Particularly, together with placing a cylindrical member between the inner peripheral surface of the cylindrical section and the base-end surfaces of the pistons, by placing a radial-needle bearing between the inner peripheral surface of the cylindrical section and the outer peripheral surface of the cylindrical member, and placing a sliding bearing between the inner peripheral surface of the cylindrical member and the base-end surfaces of the pistons, it is possible to keep the resistance of the portion that moves relative to the rotation of the hub low, and thus it is possible keep the resistance against the rotation of the hub low.

Furthermore, by placing an eccentric ring between the inner peripheral surface of the rotor and outer peripheral surface of the hub, or by making the cylindrical section of the cover concentric with the outer ring and placing both an inner and outer eccentric ring on the inner side of the cylindrical section, it is possible to adjust the discharge amount of compressed air. For example, it is possible to adjust the phase in the rotational direction of the inner eccentric ring, and to adjust the amount of eccentricity of the inner peripheral surface of the inner eccentric ring. Also, it is possible to adjust the amount of displacement of the pistons within the cylinder holes and to adjust the discharge amount of compressed air. Therefore, in a state where compressed air is not very necessary, it is possible to keep the amount of work performed by the air compressor low, and to keep the resistance against the rotation of the hub sufficiently low. Particularly, by making the amount of eccentricity of both of the eccentric rings described above the same, and making the direction of eccentricity of these eccentric rings opposite from each other, it becomes possible to make the amount of work performed by the air compressor zero, and thus it is possible to keep the resistance against the rotation of the hub even lower.

The same function and effect can also be obtained by, instead of using the outer eccentric ring described, making the center axis of the cylindrical section of the cover eccentric with respect to the center axis of the outer ring by just the amount corresponding to the amount of eccentricity between the inner and outer peripheral surfaces of the outer eccentric ring.

On the other hand, with construction in which a cylindrical section that is eccentric with respect to the outer ring and cylinder block is located in part of the cover that covers the opening on the inside end in the axial direction of the outer ring, and an oscillating ring is supported on the inner side of the cylindrical section so that the center axis of the oscillating ring is parallel with the center axis of the cylinder block and is such that it can freely rotate with respect to the cylindrical section, and with the portions of the base-end sections of the pistons that protrude outward in the radial direction from the outer peripheral surface of the cylinder block engaging with part of the oscillating ring so that they are essentially prevented from displacement in the radial direction of the oscillating ring, but can move in the circumferential direction, the construction is somewhat complex, however, it is not necessary to use compression springs between the tip-end surfaces of the pistons and the back-end surfaces of the cylinder holes. In other words, the pistons move back and forth in the radial direction of the hub based on the engagement between the base-end sections and the oscillating ring. Therefore, compressions springs are not necessary, and the force required when pushing the pistons inside the cylinder holes in order to compress air can be reduced by amount of the elastic force of the compressions springs. As a result, only a small force is required for driving the air compressor, and thus it is possible to keep the resistance against the rotation of the hub low.

When embodying this invention, when employing construction in which, for example, a radial-needle bearing is located between the inner peripheral surface of the cylindrical section and the outer peripheral surface of the oscillating ring, and arc-shaped long holes that are long in the circumferential direction of the oscillating ring are formed in part of the oscillating ring that faces the base ends of the pistons so that they are concentric with the oscillating ring, and pins that are parallel with the center axis of the oscillating ring are formed on the base-end sections of the pistons such that these pins can fit inside and freely move in the lengthwise direction of the long holes, the construction is relatively simple, and the function and effect of being able to keep the force required for driving the air compressor low is obtained.

In the construction of the one embodiment of the invention, the cylinder block is fastened to the inside end of the hub so that it is concentric with the hub, so this construction is suitable for undriven wheels (rear wheels of a FF vehicle, and front wheels of a FR or RR vehicle). Therefore, when using a cover, the cover covers the entire opening on the inside end in the axial direction of the outer ring, which is adequate for preventing foreign matter from getting inside the wheel-supporting rolling bearing unit. Therefore, forming an intake opening in part of the cover, as well as locating an air filter or ventilator in that intake opening is suitable from the aspect of both drawing air into the air compressor and preventing foreign matter from getting inside the compressor.

On the other hand, in the other embodiment of the invention, the cylinders are supported and fastened so that they are at an angle with respect to the hub, or in other words are oriented in the tangential direction or near tangential direction, so it is possible to place the drive shaft of a constant-velocity joint on the inner radial side of the cylinders. Therefore, construction is suitable for drive wheels (front wheels for a FF vehicle, rear wheels for an FR or RR vehicle, or all wheels for a 4WD vehicle).

When embodying this invention, using a first through third link arm, a toggle mechanism is formed that expands and contracts the first and second link arms, and by moving the pistons back and forth by this toggle mechanism, the force applied in the direction that moves the pistons back and forth can be increased.

As a result, it becomes possible to increase the pressure of the compressed air that is obtained from the feed path. When the mass (pressure×discharge flow amount) of the compressed air that is obtained during one rotation of the hub is kept the same, it is possible to reduce the discharge flow amount by the amount that the pressure is increased. Also, by reducing the discharge flow amount, it is possible to make the air-compressor elements comprising cylinders and pistons more compact, and make the overall wheel-supporting rolling bearing unit with air compressor more lightweight.

BRIEF DESCRIPTION OF THE DRAWINGS

FIG. 5A shows the state of maximum discharge, and FIG. 5B shows the state of minimum discharge.

DESCRIPTION OF THE PREFERRED EMBODIMENTS

First Example

Figure 1:
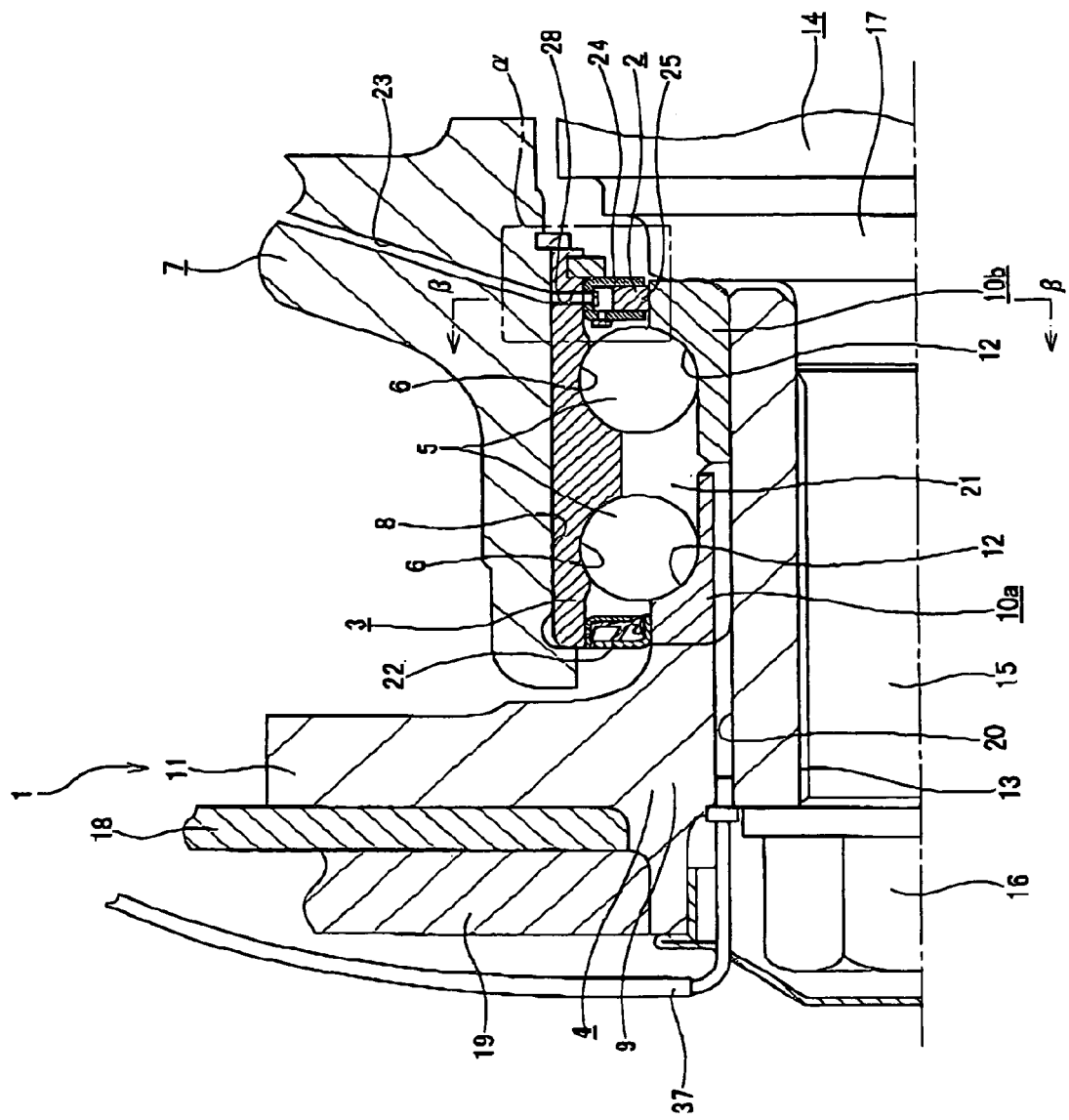
FIG. 1 is a partial cross-sectional view of a first example of the present invention.
Figure 2:
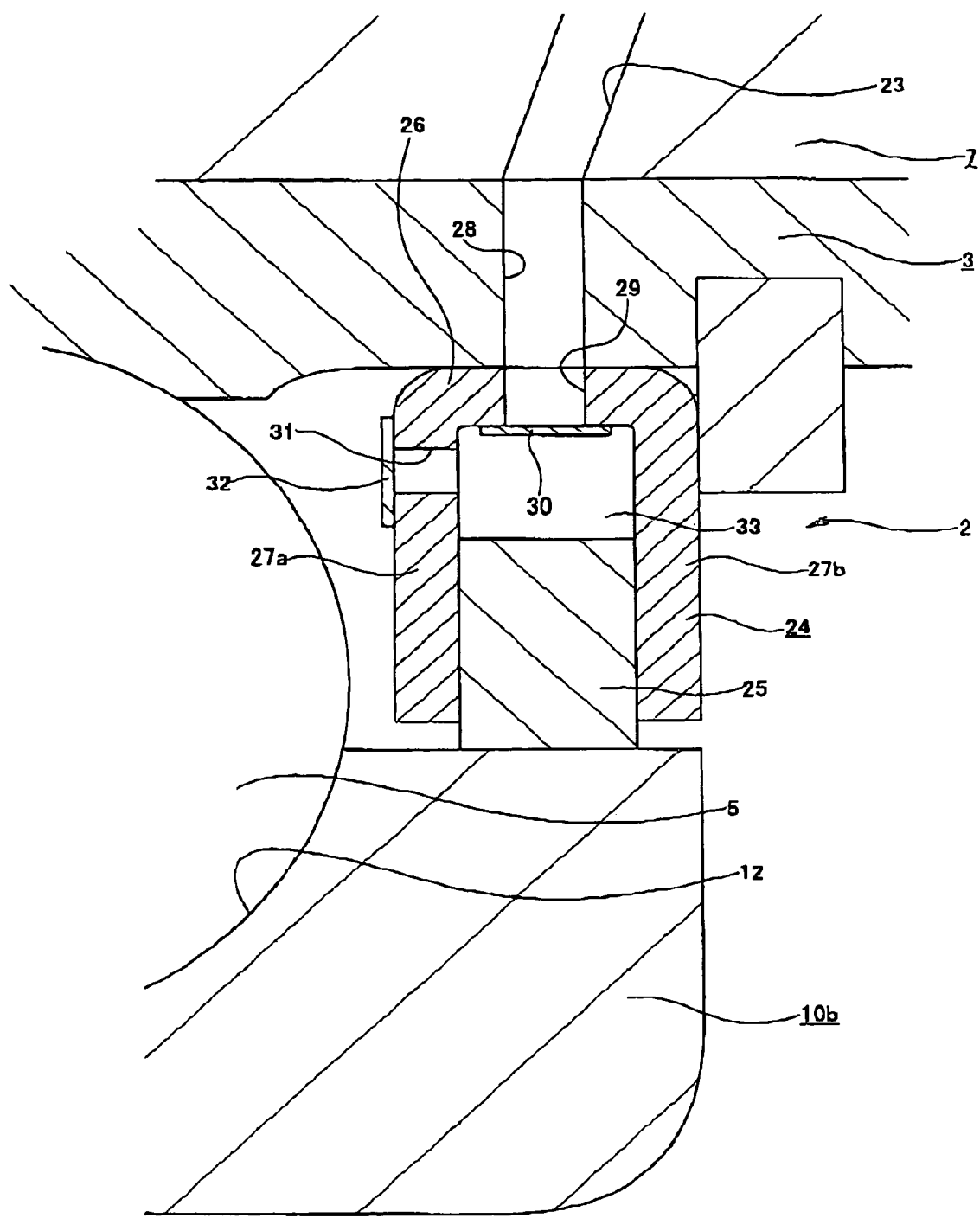
FIG. 2 is an enlarged view of part a in FIG. 1.
Figure 3:
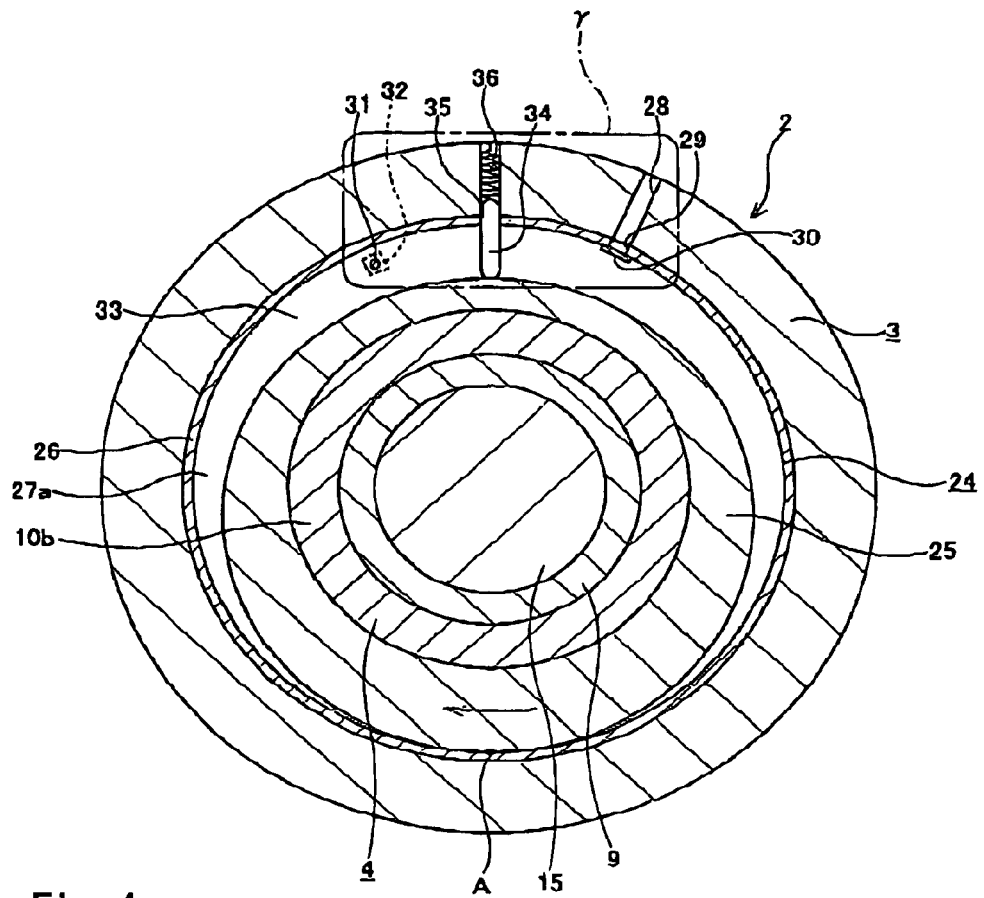
FIG. 3 is a view of section $\beta$-$\beta$ in FIG. 1 with part omitted.
Figure 4:
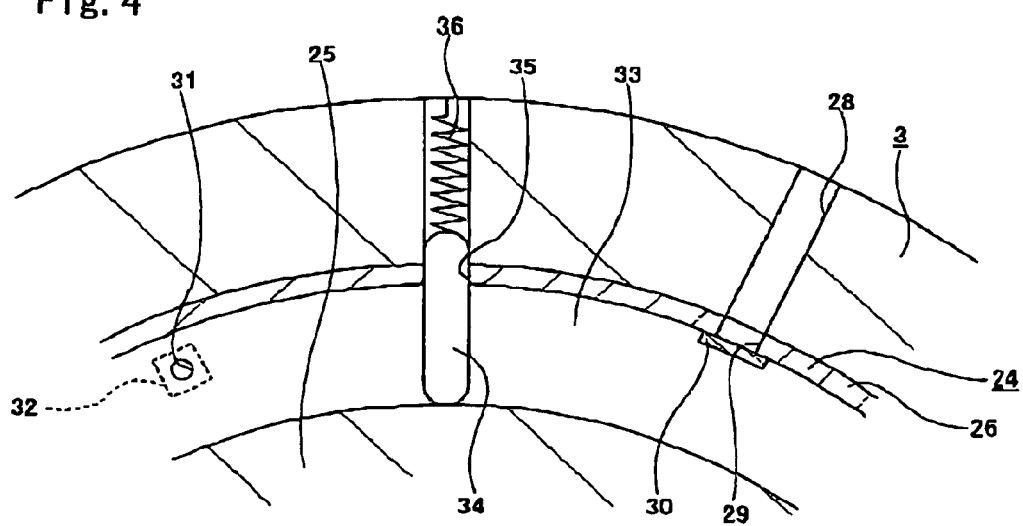
FIG. 4 is an enlarged view of part $\gamma$ of FIG. 3.
Figure 5:
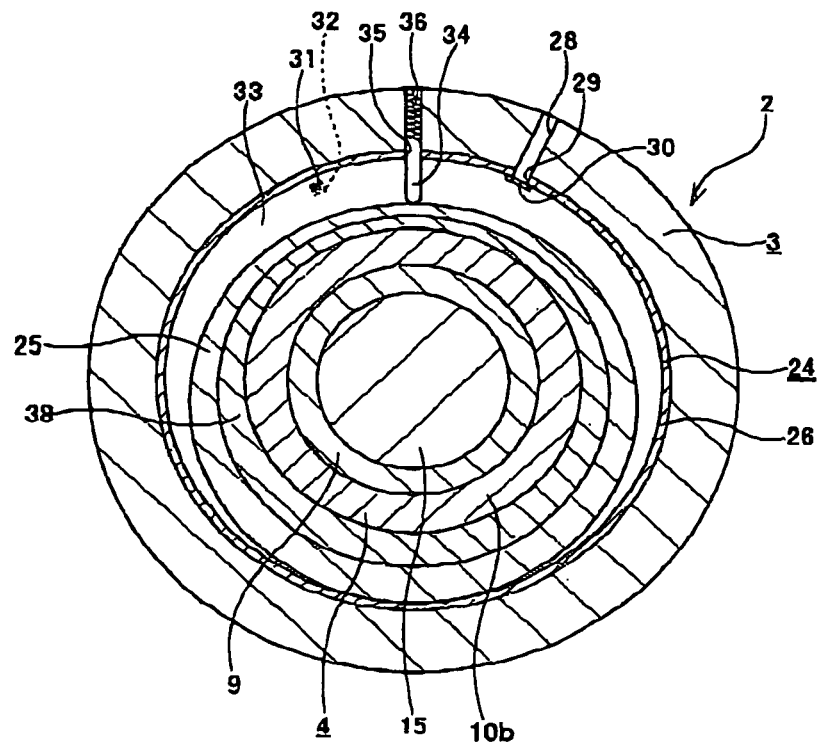
FIG. 5A and FIG. 5B are similar to FIG. 3 and show a second example of the present invention, where
Figure 5:
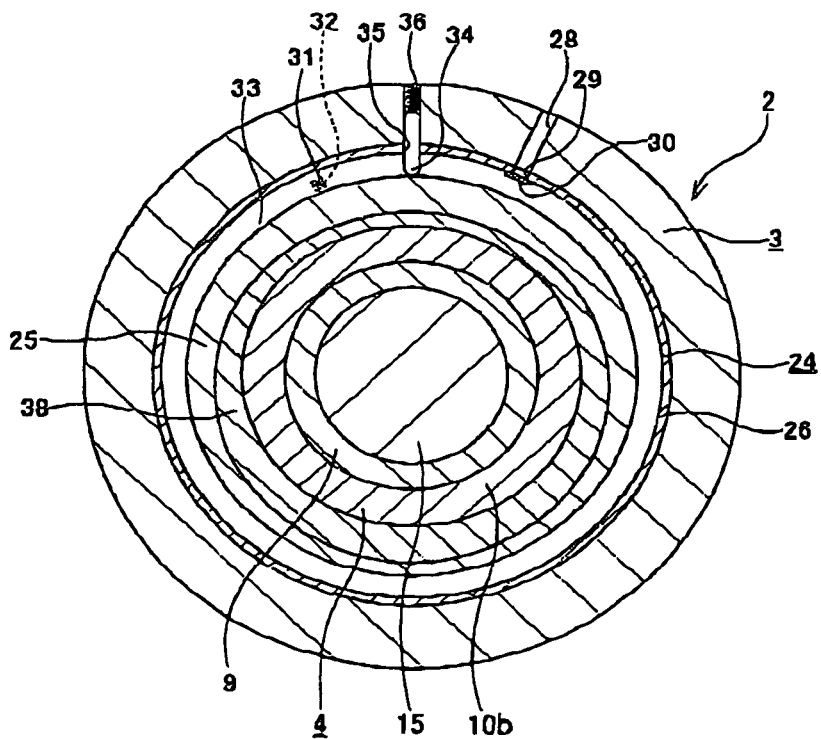

FIGS. 1 to 4 show a first example of the invention. The wheel-supporting rolling bearing unit with air compressor of this example comprises a rotary air compressor 2 that is installed on the inside end in the axial direction of a wheel-supporting rolling bearing unit 1. Of these, the wheel-supporting rolling bearing unit 1 comprises an outer ring 3, hub 4 and a plurality of rolling elements 5. Of these, the outer ring 3 is formed so that there is a double row of outer raceways 6 formed around its inner peripheral surface, and so that the outer peripheral surface has a cylindrical surface shape. During use, this kind of outer ring 3 is fitted into the support hole 8 of the knuckle 7 of the suspension apparatus and does not rotate, and it is positioned in the axial direction by being held from both sides in the axial direction between a rim section and retaining ring. Here, inside in the axial direction means the side that is toward the middle in the width direction of the vehicle when assembled in the suspension apparatus, and is the right side in FIGS. 1, 6, 7, 11, 13, 15, 17 and 22.

Also, the hub 4 comprises a pair of inner rings 10a, 10b that are fastened around the outer peripheral surface of a hub body 9, where a connection flange 11 is formed around the outside end in the axial direction of the outer peripheral surface, and similarly, a double row of inner raceways 12 are formed around the outer peripheral surface in the middle section and on the inside end in the axial direction. When in use, this kind of hub 4 is such that the wheel is connected and fastened to the connection flange 11, and rotates with the wheel. Here, outside in the axial direction means the side toward the outside in the width direction of the vehicle when assembled in the suspension apparatus, and is the left side in FIGS. 1, 6, 7, 11, 13, 15, 17 and 22.

In this example, the wheel-supporting rolling bearing unit 1 described above is for the drive wheels, so a spline hole 13 is formed in the center of the hub body 9, and the spline shaft 15 of the constant-velocity joint 14 is inserted into this spline hole 13. Also, the hub 4 is held between a nut 16 that is screwed onto the tip end section of the spline shaft 15 and a housing 17 that is located at the base end section of the constant-velocity joint 14. Moreover, the rolling elements 5 are located between both outer raceways 6 and both inner raceways 12 so that a plurality of rolling elements in each row can rotate freely. Furthermore, when in use, a brake rolling body 18 such as a disk rotor, and wheel 19 of the wheel are connected and fastened to the connection flange 11. An air-supply path 20 for feeding compressed air that is discharged from the air compressor 2 toward the wheel is located within the hub 4. This air-supply path 20 is part of the feed path.

Of the openings that are located on both ends of the bearing space 21 that is formed between the inner peripheral surface of the outer ring 3 and outer peripheral surface of the hub 4 in which the rolling elements 5 are located, the opening on the outside end in the axial direction is covered by a seal ring 22, and the opening on the inside end in the axial direction is covered by the air compressor 2. Also, these covers prevent grease that is filled inside the bearing space 21 from leaking, prevent foreign matter that is outside of the space from getting inside, and prevent compressed air that is fed inside the bearing space 21 from leaking. The seal ring 22 is typically used as the seal for the wheel-supporting rolling bearing unit 1, and is a combination seal ring. Also, the air compressor 2 is formed into a circular ring shape, and together with covering the opening on the inside end in the axial direction of the bearing space 21, is located inside the knuckle 7 and compresses air that is drawn in from an air-intake path 23 that runs to the outside space, then feeds this compressed air through the bearing space 21 to the inside of the air-supply path 20. There is a filter located in the upstream end of the air-intake path 23 for removing foreign matter.

This kind of air compressor 2 comprises: a casing 24 that does not rotate and that is fastened into the inside end section in the axial direction of the outer ring 3; and a rotor 25 that is fastened onto the inside end section in the axial direction of the inner ring 10b that is located on the inside in the axial direction, and rotates together with the inner ring 10b. Of these, the casing 24 is formed into a circular ring shape as a whole by bending an anti-corrosive metal plate such as stainless steel plate, or by injection molding of a high-molecular material such as high-performance resin having sufficient strength. This kind of casing 24 comprises: a cylindrical section 26, and a pair of circular ring sections 27a, 27b that are bent at right angles inward in the radial direction from both ends in the axial direction of the cylindrical section 26, and its cross section is such that the inner radial side is open, and the cylindrical section 26 is fastened by a tight fit into the inside end section in the axial direction of the outer ring 3.

On the other hand, the rotor 25 is formed into a circular ring shape having a rectangular cross section from a material that can slide easily over the material of the casing 24, such as copper alloy including brass, high-performance resin and the like. The center axis of the outer peripheral surface of the rotor 25 is parallel to but eccentric with the center axis of the inner peripheral surface thereof. Also, the thickness in the radial direction of the rotor 25 gradually changes in the circumferential direction. This kind of rotor 25 is fastened by an interference fit onto the inside end section in the axial direction of the inner ring 10b that is located on the inside in the axial direction. Also, in this state, the inner peripheral surfaces of the pair of circular ring sections 27a, 27b of the casing 24 come in sliding contact in airtight manner with the surfaces on both sides in the axial direction of the rotor 25. At least one of these circular ring sections 27a, 27b is formed by bending or injection molding after being housed inside the inner-radial side of the rotor 25. Also, the outer peripheral surface of this rotor 25 and the inner peripheral surface of the cylindrical section 26 come in sliding contact or face each other very closely in the section where the thickness in the radial direction of the rotor is the greatest.

Moreover, near the inside end in the radial direction of the outer ring 3, an air-intake hole 28 is formed in the section that fits in the opening on the downstream end of the air-intake path 23 of the knuckle 7 so that it runs through the radial direction of the outer ring 3. Also, an air-intake port 29 is formed in part of the cylindrical section 26 of the casing 24 in the section that fits in the air-intake hole 28, and of the inner peripheral surface of the cylindrical section 26, an air-intake check valve 30 such as a reed valve is located in this air-intake port section 29. This air-intake check valve 30 opens when drawing air through the air-intake port 29 inside the casing 24, and when the pressure inside the casing 24 has risen, it closes the air-intake port 29. On the other hand, of the circular ring sections 27a, 27b, there is a discharge port 31 located on the part of the circular ring section 27a located on the outside in the axial direction that faces the bearing space 21 where the phase in the circumferential direction is slightly shifted from the air-intake port 29 to rear in the rotational direction of the rotor 25. Also, a discharge check valve 32 such as a reed valve is located in this discharge port section 31 in the section on the outside surface in the axial direction of the circular ring section 27a. This discharge check valve 32 opens when air in the casing 24 is discharged through the discharge port 31, and closes the discharge port 31 when the pressure inside the casing is low. In FIGS. 1 to 4 (and in FIGS. 5 to 7 and 10 to 12 described later), the thicknesses of the air-intake check valve 30 (30a) and the discharge check valve 32 are drawn thicker than the actual thicknesses. Also, the reed actually prevents interference with the rotor by freely entering the appropriate depression.

There is a vane 34 located in part of the air-compression space 33 that is partitioned off by the inner peripheral surface of the casing 24 and the outer peripheral surface of the rotor 25 in the section between the air-intake port 29 and discharge port 31. This vane 34 is inserted through a slit-shaped through hole 35 that is formed at a part of the cylindrical section 26 of the casing 24 and through the entire with of the cylindrical section 26 so that it can move in the radial direction of the casing 24 and rotor 25. Also, a spring 36 applies an elastic force to the vane 34 in the inward radial direction of the casing 24 and rotor 25. The edge on the tip end of the vane 34 elastically slides over the outer peripheral surface of the rotor 25, and the edges on both sides of the vane 34 come in sliding contact with or come very close to the inside surfaces of both circular ring sections 27a, 27b. In this way, the vane 34 is constructed so that it blocks both ports 29, 31 regardless of the phase in the rotational direction of the rotor 25. In order to make it possible to move the vane 34 and install the spring 36, it is possible, when necessary, to make the cylindrical section 26 thick and to cut out part of the outer ring 3.

During operation of the wheel-supporting rolling bearing unit with air compressor in which the air compressor 2 described above is installed, the rotor 25 rotates on the inner side of the casing 24 as the hub 4 rotates. As the rotor 25 rotates, the section where the outer peripheral surface of the rotor 25 and the inner peripheral surface of the cylindrical section 26 come in sliding contact or that are very close to each other (section A in FIG. 3) move in the circumferential direction. Also, in the air compression space 33, as the volume of the part that faces the air-intake port 29 increases, air is drawn through this air-intake port 29. Moreover, in the air compression space 33, as the volume of the part that faces the discharge port 31 decreases, compressed air is discharged from the discharge port 31 into the bearing space 21. The compressed air that is discharged into the bearing space 21 is fed into the tire of the wheel through the air-supply path 20 and the air-supply tube 37, the upstream of which connects the downstream end of the air-supply path 20. Therefore, by installing a suitable pressure-regulation mechanism in the middle of the air-supply tube 37 for example, it is possible to regulate the air pressure inside the tire.

Second Example

FIGS. 5A and 5B show a second example of the present invention. In this example, there is an eccentric ring 38 located between the outer peripheral surface of the inner ring 10b of the hub 4 and the inner peripheral surface of the rotor 25. Similar to the rotor 25, this eccentric ring 38 has a circular ring shape with a rectangular cross section, and the center axis of the outer peripheral surface is parallel to but eccentric with the center axis of the inner peripheral surface. The amount of eccentricity between the inner and outer peripheral surfaces of the eccentric ring 38 is the same as the amount of eccentricity between the inner and outer peripheral surfaces of the rotor 25. Also, a driving mechanism, such as an ultrasonic motor, is located between the inner peripheral surface of the rotor 25 and the outer peripheral surface of the eccentric ring 38 for driving and rotating the rotor 25 with respect to this eccentric ring 38 by a vibrating element such as a piezo element.

In this example, by matching the direction of eccentricity of the rotor 25 and the eccentric ring 38 as shown in FIG. 5A, the amount of eccentricity of the outer peripheral surface of the rotor 25 with respect to the hub 4 becomes a maximum, and by making the direction of eccentricity of the rotor 25 and the eccentric ring 38 different by 180 degrees, the amount of eccentricity of the rotor 25 with respect to the hub 4 becomes zero, which stops the discharge of compressed air and makes it possible to suppress the resistance to the rotation of the hub 4. The other construction and function of this example are the same as that of the first example described above, so any redundant explanation is omitted.

Third Example

Figure 6:
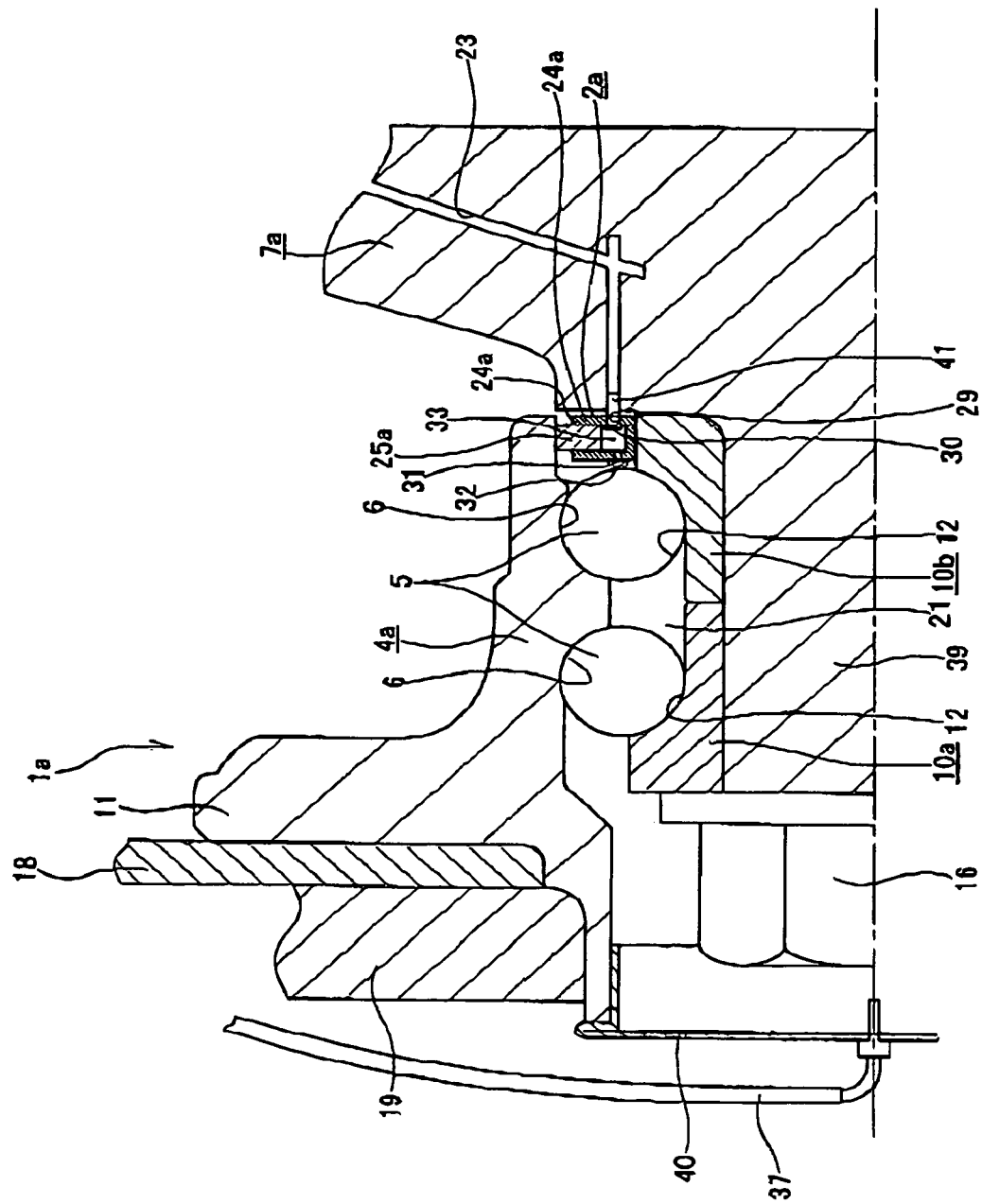
FIG. 6 is a partial cross-sectional view of a third example of the present invention.

FIG. 6 shows a third example of the present invention. In this example, opposite to that of the first and second examples described above, the member corresponding to the inner ring is taken to be the stationary ring. Also, the wheel that is supported by the wheel-supporting rolling bearing unit 1a so that it rotates freely is an undriven wheel. Therefore, in the case of this example a pair of inner rings 10a, 10b are fitted onto the shaft section 39 on part of the knuckle 7a of the suspension apparatus and fastened by a nut 16. Moreover, surrounding both of these inner rings 10a, 10b is the hub 4a, which is the member corresponding to the outer ring, and it rotates together with the wheel 19 and brake rotating member 18, and is supported by a plurality of rolling elements 5 so that it can rotate freely.

In the case of this example, the construction of the air compressor 2a is such that the inside and outside in the radial direction are opposite that of the first and second examples. In other words, a casing 24a that is opened on the outer side in the radial direction is fastened with interference fit around the outer peripheral surface of the inside end section in the axial direction of the inner ring 10b that is located of the inside in the axial direction and that constitutes part of the stationary ring. The air-intake port 29 in this casing 24a is connected to the downstream end of the air-intake path 23 within the knuckle 7a by a connection tube 41. Also, a rotor 25a is fastened with interference fit around the inner peripheral surface on the inside end section in the axial direction of the hub 4a. Furthermore, the opening on the outside end in the axial direction of this hub 4a is covered so that it is airtight by a cap 40, and the upstream end of an air-supply tube 37 is connected to this cap 40 so that the compressed air that is discharged into the hub 4a is freely fed into the tire of the wheel. The reed which constitutes an air-intake check valve 30 is formed on the internal surface of the casing 24a so that it enters inside a concave section (not shown in the figure) to prevent interference between this reed and the rotor 25a; or it possible to an air-intake check valve, such as a ball valve, in the middle of the air-intake path 23. The other construction and function of this example are the same as that of the first example described above, so any redundant explanation is omitted.

Fourth Example

Figure 7:
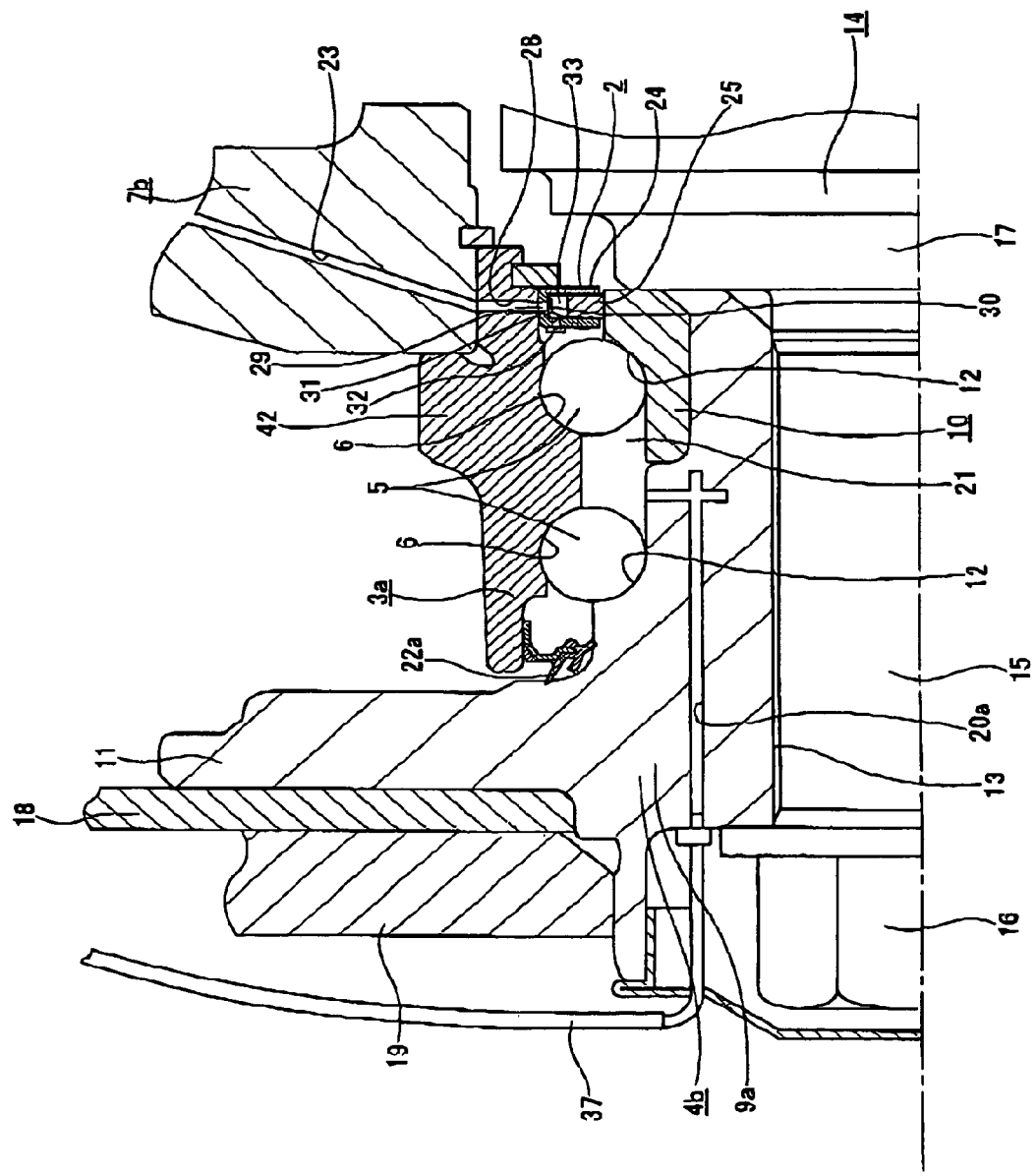
FIG. 7 is a partial cross-sectional view of a fourth example of the present invention.

FIG. 7 shows a fourth example of the present invention. In this example, the hub 4b comprises a hub body 9a and one inner ring 10. The inner raceway 12 that is on the outside in the axial direction is formed directly around the outer peripheral surface in the middle section in the axial direction of the hub body 9a. Also, an outward facing flange-shaped installation section 42 is formed around the outer peripheral surface of the outer ring 3a, and by fastening this installation section 42 to a knuckle 7b with a bolt, the outer ring 3a is supported by and fastened to the knuckle 7b. Also, the shape of the seal ring 22a that covers the outside end section in the axial direction of the bearing space 21 between the inner peripheral surface of the outer ring 3a and the outer peripheral surface of the hub 4b is such that it corresponds to the shape of the outer peripheral surface of the hub 4b on the outside end section. Furthermore, an air-supply path 20a for guiding the compressed air inside the bearing space 21 to the air-supply tube 37 is located within the hub body 9a. The other construction and function of this example are the same as that of the first example described above, so any redundant explanation is omitted.

Fifth Example

Figure 8:
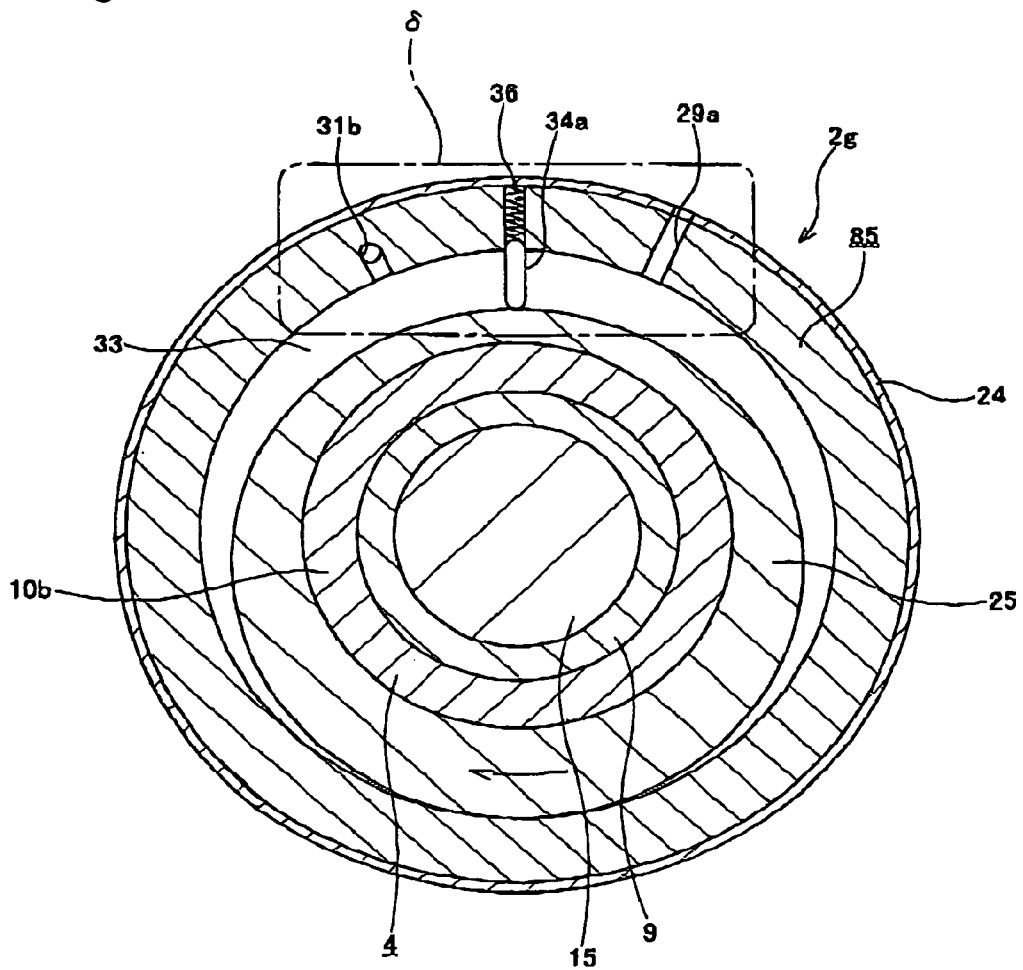
FIG. 8 is similar to FIG. 3 and shows a fifth example of the invention.
Figure 9:
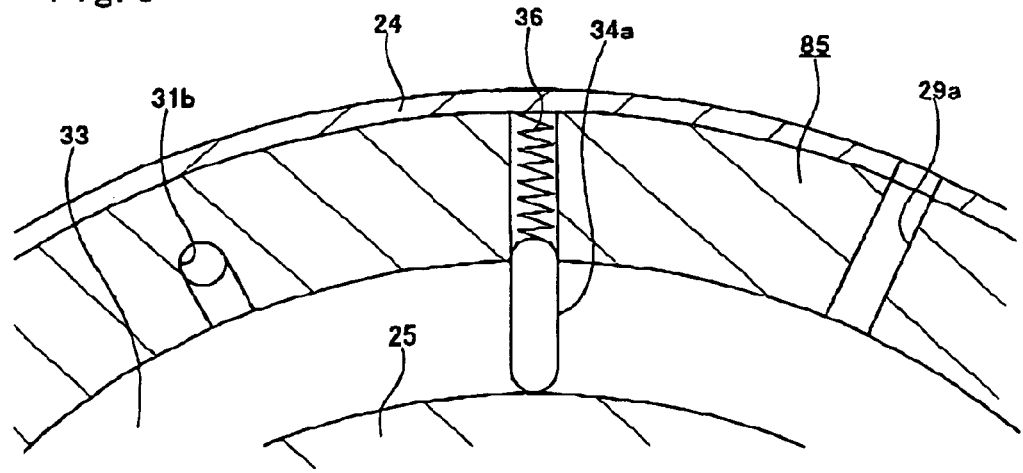
FIG. 9 is an enlarged view of part $\delta$ in FIG. 8.

FIG. 8 and FIG. 9 show a fifth example of the present invention. In this example, a cylindrical shaped sleeve 85 is fastened into the casing 24, and the rotor 25 is set on the inner side of this sleeve 85 so that it can rotate freely. Also, an air-intake port 29a, which is connected to an air-intake hole 28 (see FIG. 2), and a discharge port 31b are located in part of this sleeve 85. A vane 34a is housed inside a slit that is formed in part of the sleeve 85 so that it can move freely in the radial direction.

With the construction of this example described above, it is not necessary to make a cut out section (see FIGS. 1 to 5) for installing the vane in the outer ring 3. Therefore, the components of the rotary air compressor 2g that include this vane can be assembled as a unit before assembling them inside the outer ring, so it is possible to simplify the work of assembling the wheel-supporting rolling bearing unit with air compressor. The other construction and function of this example are the same as that of the first example described above, so any redundant figures and explanation are omitted.

Sixth Example

Figure 10:
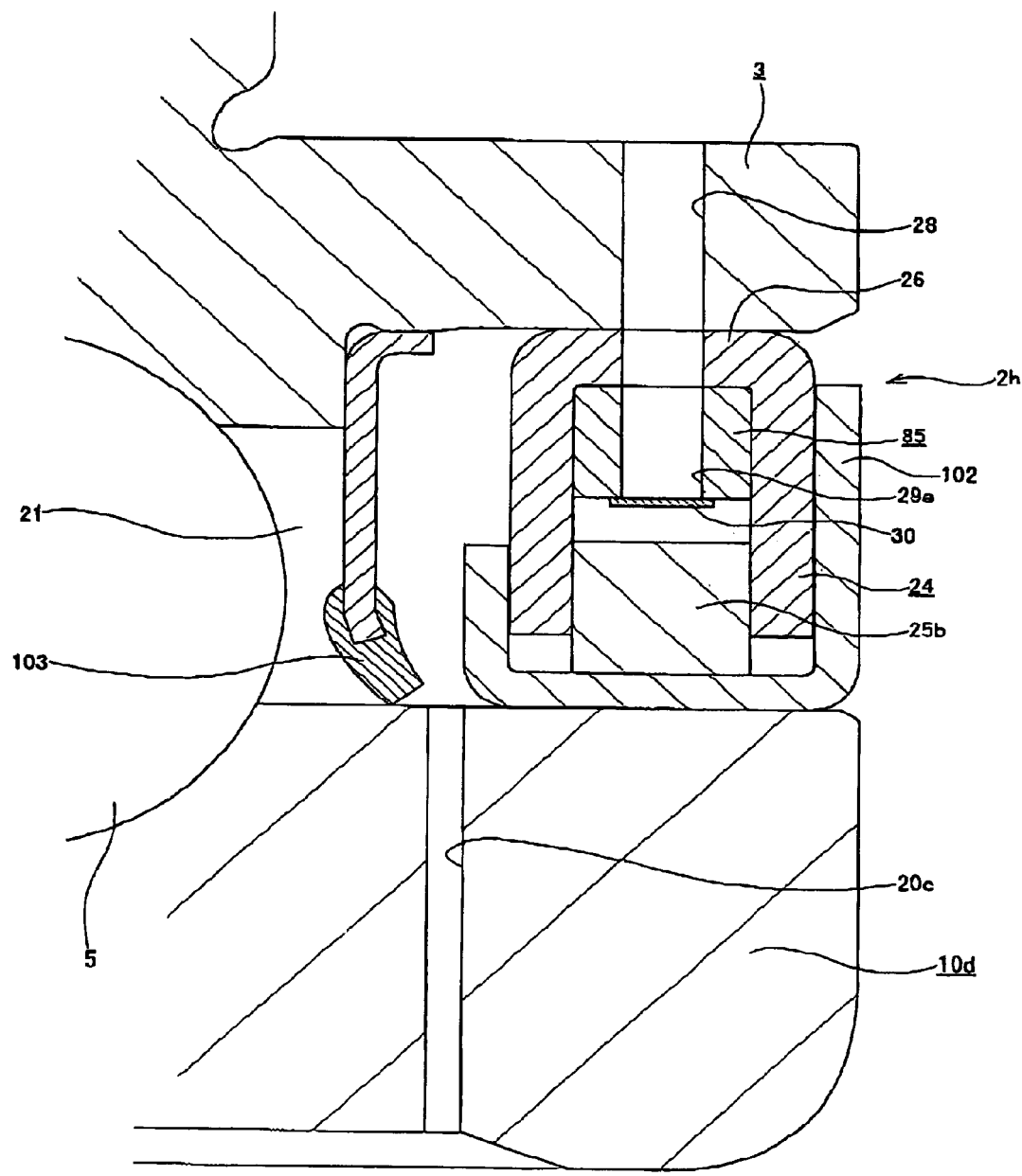
FIG. 10 is similar to FIG. 2 and shows a sixth example of the present invention.

FIG. 10 shows a sixth example of the present invention. In this example, the rotor 25b is fastened onto the outer peripheral surface of an inner ring 10d by way of a ring-shaped sleeve 102, which is formed by bending a metal plate so that it has a J-shaped cross section, to form a rotary air compressor 2h. Also, there is a seal ring 103 located between this air compressor 2h and the bearing space 21, and it keeps the compressed air that is discharged from the air compressor 2h from entering into the bearing space 21. The compressed air is fed through an air-supply path 20c that is formed in the inner ring 10d to an air-supply tube 37 (see FIG. 1). The other construction and function of this example are the same as that of the first example described above, so any redundant figures and explanation are omitted.

Seventh Example

Figure 11:
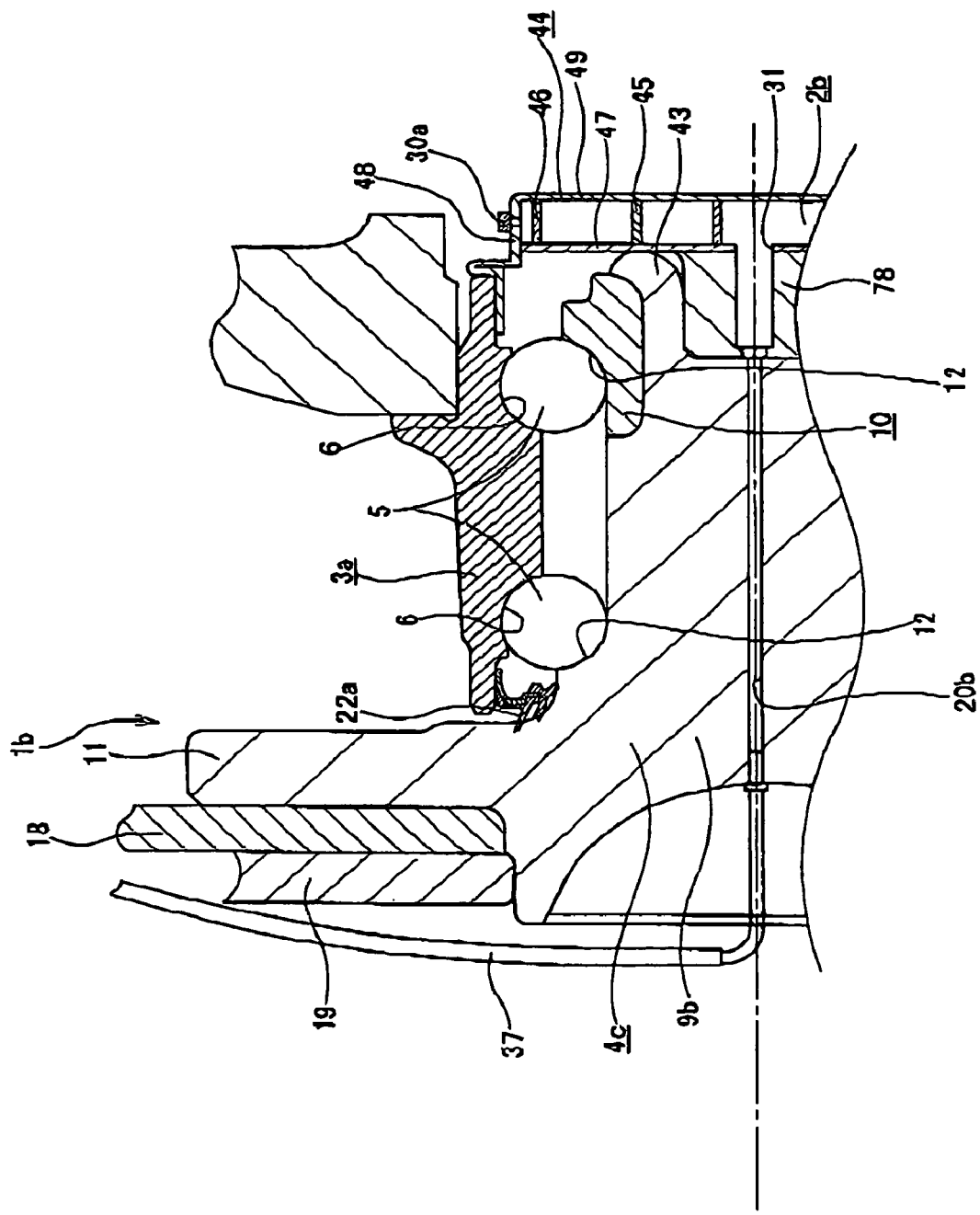
FIG. 11 is partial cross-sectional view showing a seventh example of the present invention.
Figure 12:
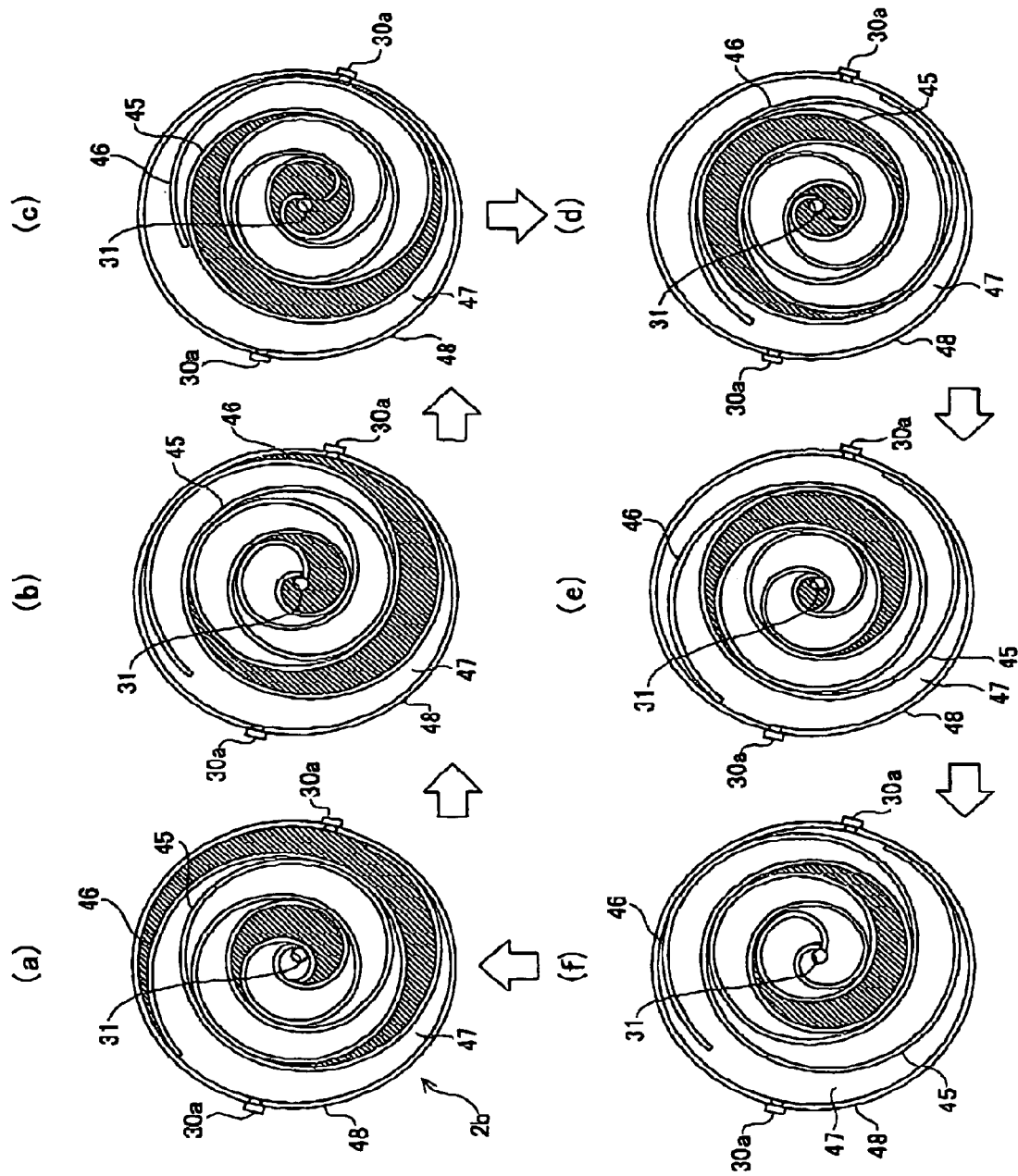
FIG. 12 (a-d) is a drawing for explaining the operation of a scroll compressor that is built into the seventh example, and shows this scroll compressor as seen from the side of FIG. 11.

FIG. 11 and FIG. 12 show a seventh example of the present invention. In this example, the wheel-supporting rolling bearing unit 1b is for an undriven wheel, and has a rotating inner ring. The hub 4c corresponds to the inner ring member, and is formed by joining and fastening one inner ring 10 to a hub body 9b by a crimped section 43 that is formed on the inside end section in the axial direction of the hub body 9b. Also, a scroll air compressor 2b is located between the inside end section in the axial direction of the hub 4c and the interior surface of a cover 44 that is fastened to the inside end section in the axial direction of the outer ring 3a that covers the opening on the inside end.

This air compressor 2b has the same construction as a prior known scroll compressor such as the compressor for a vapor compression refrigerator and comprises: a stationary scroll member 45 that is fastened to the interior surface of the cover 44; a rotating scroll member 46 that is fastened to the end surface in the axial direction of the hub 4c and rotates together with the hub 4c; and a partition plate 47 that partitions the portion where both scroll members 45, 46 are located from other portions.

The rotating scroll member 46 is fastened to the inside surface in the axial direction of the partition plate 47, and is fastened to the inside end section in the axial direction of the hub 4c by way of this partition plate 47 and an air-supply block 78 that is fastened to the center section of the outside surface in the axial direction of the partition plate 47. The outer edge of this partition plate 47 comes in sliding contact or is very close to the inner peripheral surface of the cylindrical section 48 of the cover 44. Also, air-intake check valves 30a that open only when outside air is drawn into the cover 44 are located at two locations on opposite sides in the radial direction of the cylindrical section 48 of the cover 44. Furthermore, there is a discharge port 31 located in the middle section of the partition plate 47, and is such that it feeds air that was compressed by the relative spiral movement of both scroll members 45, 46 to an air-supply tube 37 through an air-supply path 20b that is located in the middle section of the air-supply block 78 and hub body 9b.

As the hub 4c rotates, the air that is drawn into the cover 44 through both air-supply check valves 30a, and is enclosed within a crescent shaped space between both scroll members 45, 46, the bottom plate section 49 of the cover 44 and the partition 47 as indicated by the diagonal lines in FIG. 12, is compressed in the order (a)→(b)→(c)→(d)→(e)→(f)→(a) as shown in the same figure, and is fed to the center section in the radial direction toward the discharge port 31. The other construction and function of this example are the same as that of the fourth example described above, so any redundant explanation is omitted.

Eighth Example

Figure 13:
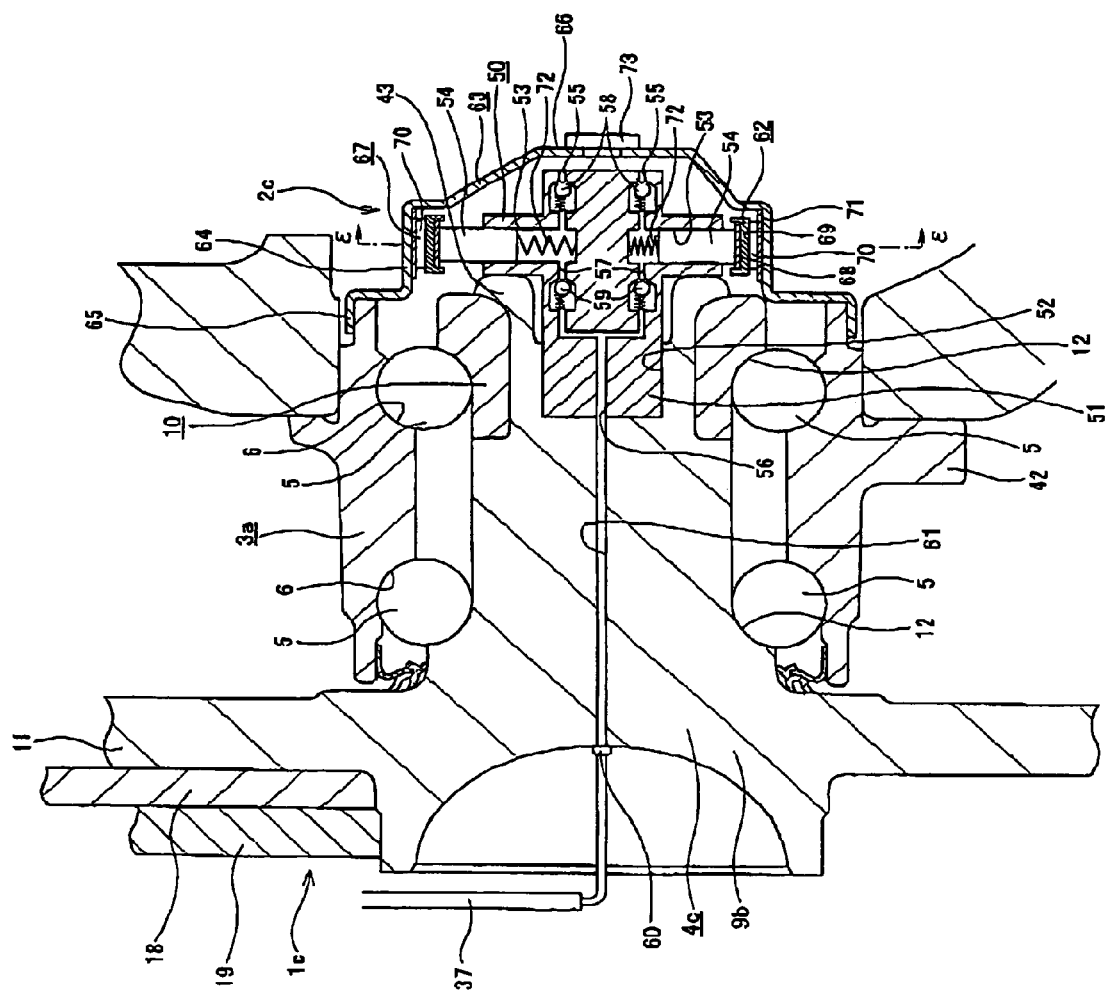
FIG. 13 is a cross-sectional drawing of an eighth example of the present invention.
Figure 14:
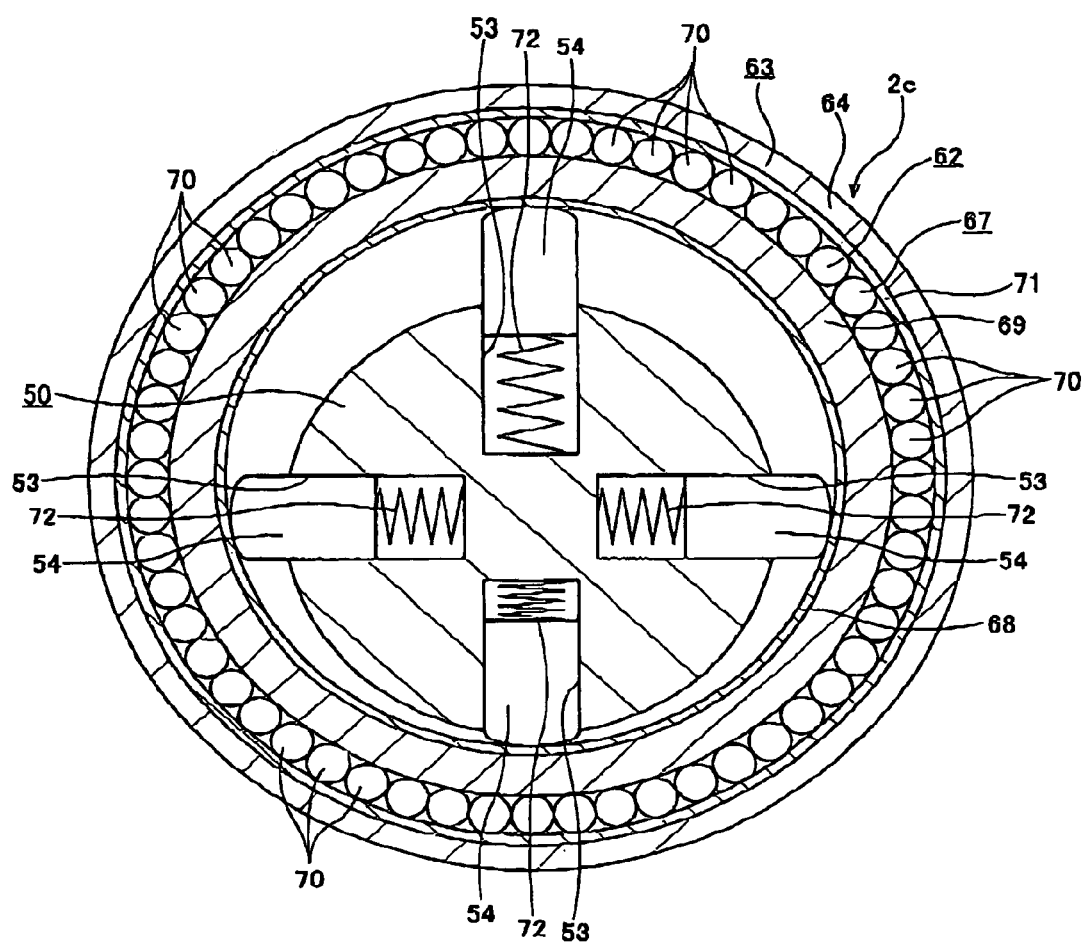
FIG. 14 is an enlarged view of section $\epsilon$-$\epsilon$ in FIG. 10.

FIGS. 13 and 14 show an eighth example of the present invention. The wheel-supporting rolling bearing unit with air compressor of this example comprises a reciprocating piston air compressor 2c that is installed in the inside end section in the axial direction of the wheel-supporting rolling bearing unit 1c. Of these, the construction of the wheel-supporting rolling bearing unit 1c is basically the same as that of the seventh example shown in FIG. 11 and described above.

On the other hand, the air compressor 2c comprises a cylinder block 50 that is fastened to the inside end section in the radial direction of the hub 4c. This cylinder block 50 is concentrically fastened to the hub 4c by tightly fitting a cylindrical column section 51, which is formed on the outside half in the axial direction, into a circular hole 52 that is formed in the inside end in the axial direction of the hub body 9b. A plurality of cylinder holes 53 (for example 3 to 6 holes) are formed at uniform intervals in the circumferential direction in the middle section in the axial direction of this cylinder block 50 in the portion that protrudes inward in the axial direction from the inside end surface in the axial direction of the hub body 9b. Inside each of these cylindrical holes 53 there is a piston 54 that is fitted into the hole in airtight manner and is such that it can move in the axial direction of the cylinder hole 53 and piston 54 (radial direction of the hub 4c and cylinder block 50). In order to maintain the amount of movement (stroke) of each piston 54, the dimension in the axial direction (depth) of the cylinder holes 53 is maintained by making the outer diameter of the portion where the cylinder hole 53 is formed in the middle section in the axial direction of the cylinder block 50 large, or by making the portion that surrounds the cylinder hole partially protrude outward in the radial direction.

Also, inside the cylinder block 50 there is the same number of air-intake paths 55 as there are cylinder holes 53 and there is a feed path 56. Moreover, the upstream portion of the feed path 56 is divided into the same number as there are cylinder holes 53, to form branch paths 57. Also, in the middle of each of the air-intake paths 56 there is an air-intake check valve 58 that is in line with the air-intake path 55, and is such that it allows air to pass only when flowing from the outside space toward the cylinder hole 53. On the other hand, in the middle of each of the branch paths 57 there is a discharge check valve 59 that is in line with the branch path, and is such that it allows compressed air to flow only from the cylinder hole 53 toward the discharge port 60 that will be described later. The downstream end of each air-intake path 55 and the upstream end of each branch path 57 are both located at the back of the cylinder hole 53, and function as the opening in the portion that is not covered by the piston 54 even when the piston 54 has moved to the back of the cylinder hole 53. Furthermore, the downstream end of the feed path 56 is connected with the upstream end of the air-supply path 61 which is located in the center section of the hub body 9b and runs through the hub body 9b in the axial direction. The opening on the outside end in the axial direction of the hub body 9b and that is the downstream end of the air-supply path 61 becomes the discharge port 60 mentioned above. When the wheel-supporting rolling bearing unit with air compressor of this example is in use, one end of the air-supply tube 37 that extends inside the tire is connected to the discharge port 60.

The air compressor 2c is such that it discharges compressed air from the discharge port 60 by moving each of the pistons 54 back and forth inside the cylinder holes 53 in the radial direction of the cylinder block 50. In order to discharge this compressed air, of the piston-drive mechanism 62 that moves the pistons 54 back and forth, a pushing mechanism for moving the pistons 54 inward in the radial direction of the cylinder block 50 is located between the inner peripheral surface of a cylindrical section 64 that is located on part of a cover 63 that covers the opening on the inside end in the axial direction of the outer ring 3a of the wheel-supporting rolling bearing unit 1c and the surface of the base end of each of the pistons (outside end in the radial direction of the cylinder block 50). The cover 63 is made from an anti-corrosive metal plate such as a stainless steel plate or a galvanized steel plate that has sufficient rigidity by forming it into a bowl shape by plastic working such as drawing, and comprises an outer cylindrical section 65 in the outer rim section thereof that is fitted with interference fit onto the inside end section in the axial direction of the outer ring 3a, and a bottom plate section 66 in the center section thereof. The cylindrical section 64 is located between the outer cylindrical section 65 and bottom plate section 66, and is eccentric with respect to the outer cylindrical section 65. Therefore, with the cover 63 fastened to the inside end section in the axial direction of the outer ring 3a, the center axis of the cylindrical section 64 becomes eccentric with respect to the center axis of the outer ring 3a.

Of the piston-drive mechanism 62, the pushing mechanism is constructed by placing a radial-needle bearing 67 and a sliding bearing 68 between the inner peripheral surface of the cylindrical section 64 and the base end surface of each of the pistons 54 in order from the side of the inner peripheral surface (outer side in the radial direction) of the cylindrical section 64. Of these, the radial-needle bearing 67 is constructed by placing a plurality of needles 70 between the inner peripheral surface of the cylindrical section 64 and the outer peripheral surface of the cylindrical shaped inner ring 69 that is placed on the inner side of the cylindrical section 64 so that it is concentric with the cylindrical section 64. This inner ring 69 corresponds to a cylindrical member. In the case of this example, a cylindrical-shaped outer ring 71 is located around the inner peripheral surface of the cylindrical section 64. Also, the sliding bearing 68 is located between the inner peripheral surface of the inner ring 69 of the radial-needle bearing 67 and the base-end surface of each of the pistons 54. This kind of sliding bearing 68 is made from a self-lubricating non-ferrous metal such as copper or copper alloy, an oil-containing metal, or a non-compressive synthetic resin such as a high-function resin. This kind of sliding bearing 68 prevents direct contact between the inner peripheral surface of the inner ring 69 and the base-end surface of the pistons 54, which are both made of steel, and prevents the occurrence of fretting wear in the contact area. Its purpose is to make it not possible for large slippage to occur between the inner ring 69 and pistons 54. On the other hand, there are compression springs 72 between tip-end surfaces of the pistons 54 (inner end surface in the radial direction of the cylinder block 50) and the back-end surfaces of the cylinder holes 53, and they apply an elastic force on the pistons 54 in the direction going out of the cylinder holes 53 (outward in the radial direction of the cylinder block 50).

The piston-drive mechanism 62 having the construction described above functions as described below, and moves the pistons back and forth inside the cylinder holes 53 as the hub 4c rotates.

As the automobile travels, the cylinder block 50 rotates together with the hub 4c, and the pistons 54 that are inside the cylinder holes 53 that are formed in the cylinder block 50 rotate together with the inner ring 69 of the radial-needle bearing 67. As can be clearly seen from the explanation above, the rotation of the inner ring 69 and the rotation of the pistons 54 do not need to be perfectly synchronized.

In either case, as the inner ring 69 rotates on the inner side of the eccentric cylindrical section 64 it moves in the radial direction of the cylinder block 50 (oscillates). Also, the portion of the inner ring 69 that moves inward in the radial direction of the cylinder block applies a force on the pistons 54 in a direction that pushes them inside the cylinder holes 53. An elastic force is applied to the pistons 54 by the compression springs 72 in a direction that pushes the pistons 54 out from the cylinder holes 53, so the oscillating movement of the inner ring 69 that occurs as the cylinder block 50 rotates moves the pistons 54 back and forth inside the cylinder holes 53 in the radial direction of the cylinder block 50.

As a result of the back and forth movement, air that was drawn into the cylinder holes 53 through the air-intake paths 55 is compressed and then fed through the feed path 56 to the discharge port 60. There is an air-intake opening with air filter 73 located in the cover 63, and is such that air that is to be drawn inside the cylinder holes 53 is taken inside the cover 63. The compressed air that is discharged from the discharge port 60 is fed through the air-supply tube 37 into the tire to raise the air pressure in the tire.

The wheel-supporting rolling bearing unit with air compressor of this example that is constructed and functions as described above can be made to be compact, and is capable of keeping the resistance against the rotation of the hub 4c to a minimum while maintaining good balance, as well as compressed air having sufficient pressure can be obtained regardless of the traveling speed of the vehicle.

In other words, in the construction of this example, a plurality of cylinder holes 53 are located at a plurality of locations that are evenly spaced in the circumferential direction. Therefore, it is possible to increase the overall volume of these cylinder holes 53 even though the volume of each individual cylinder hole 53 is decreased, thus making it possible to maintain the amount of compressed air that is obtained during one rotation of the hub 4c.

Moreover, the instant when the pressure of the compressed air at the back section of each cylinder hole 53 becomes high and the force required to move the pistons 54 inside the cylinder holes 53 in the axial direction becomes large, shifts in the rotational direction of the hub 4c for each individual cylinder hole 53. Therefore, it is possible to keep the fluctuation of resistance against the rotation of the hub 4c due to the rotation position of the hub 4c low, and thus it is possible to keep this resistance low with good balance.

Also, in the construction of this example, compressed air is generated by a reciprocating-piston air compressor. The pressure of the compressed air that is discharged from the reciprocating-piston air compressor is determined by the stroke of the pistons 54 and the volume of the space at the back section of each of the cylinder holes 53 when the pistons 54 are pressed all the way into the cylinder holes 53. In other words, it is not affected by the rpm of the hub 4c. Therefore, the pressure of the obtained compressed air becomes constant even when the rpm of the hub 4c changes, and thus it is possible to obtain compressed air having steady pressure.

Furthermore, the individual cylinder holes 53 are compact, so these cylinder holes 53 can be efficiently placed around the cylinder block 50, and it becomes easy to design the cylinder block 50 so that it can installed inside a limited space inside the cover 63 of the wheel-supporting rolling bearing unit 1c. Therefore, it is possible to make a compact and lightweight wheel-supporting rolling bearing unit with air compressor.

The wheel-supporting rolling bearing unit with air compressor is located further toward the side of the road than the spring of the suspension apparatus, and becomes the so-called unsprung load, and even a small increase in weight lowers the driving performance, for example comfort and driving stability, of the vehicle. Therefore, making the construction lightweight is advantageous from the aspect of maintaining driving performance.

Also, in the case of this example, the air-intake check valve and discharge check valve 58, 59 are located in independent air-intake paths 55 and branch paths 57 for each cylinder hole 53, so it is possible to improve freedom for installing the check valves 58, 59 while at the same time maintaining the function as a reciprocating-piston air compressor. Therefore, it becomes easier to make the overall wheel-supporting rolling bearing unit with air compressor more compact and lightweight.

Furthermore, with the construction of this example, compressed air is obtained using simple construction, and it is possible to keep the resistance of the portion of relative displacement that occurs as the hub 4c rotates low, as well as keep the resistance against the rotation of the hub 4c low.

Ninth Example

Figure 15:
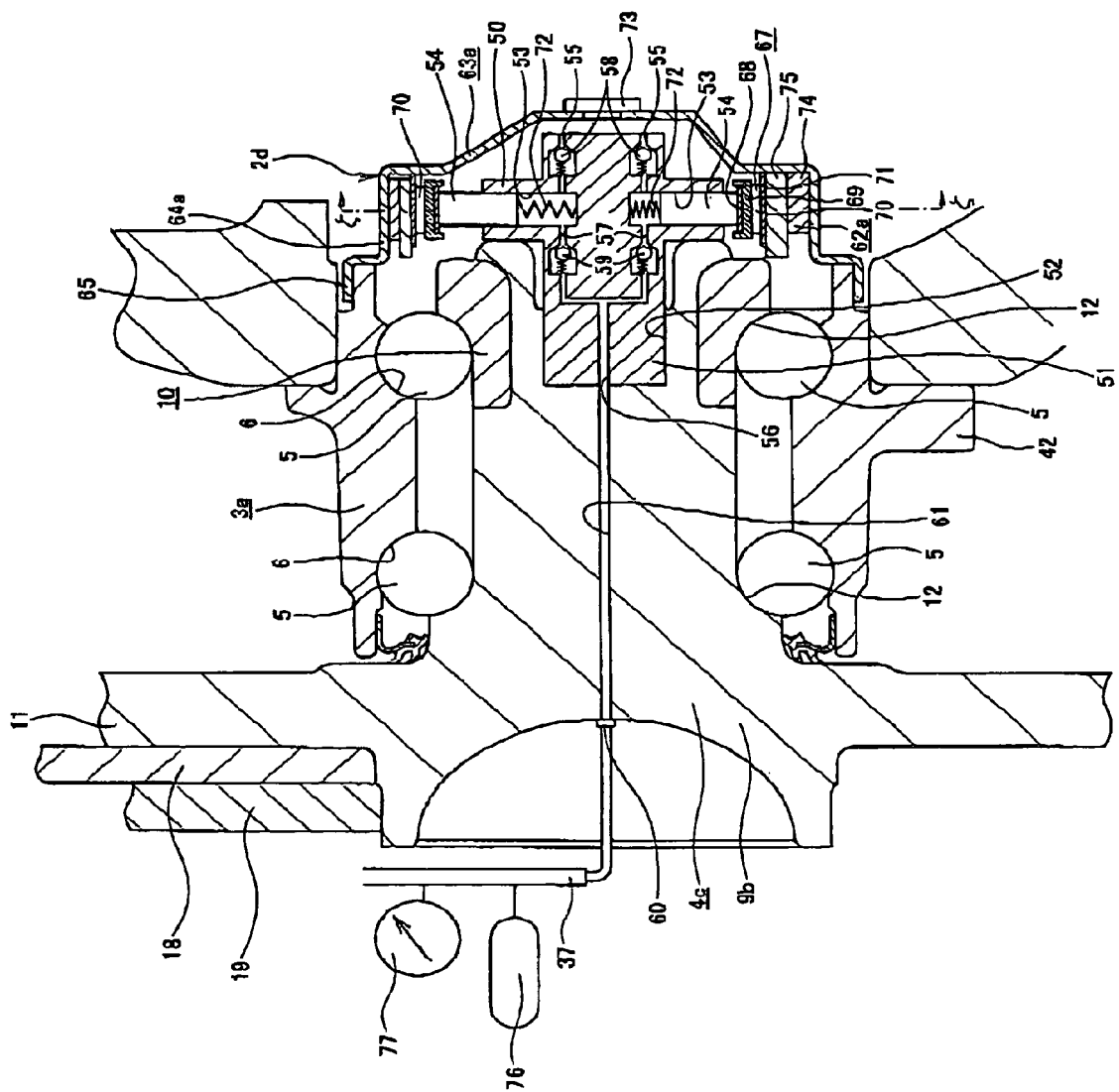
FIG. 15 is a cross-sectional view of a ninth example of the present invention.
Figure 16:
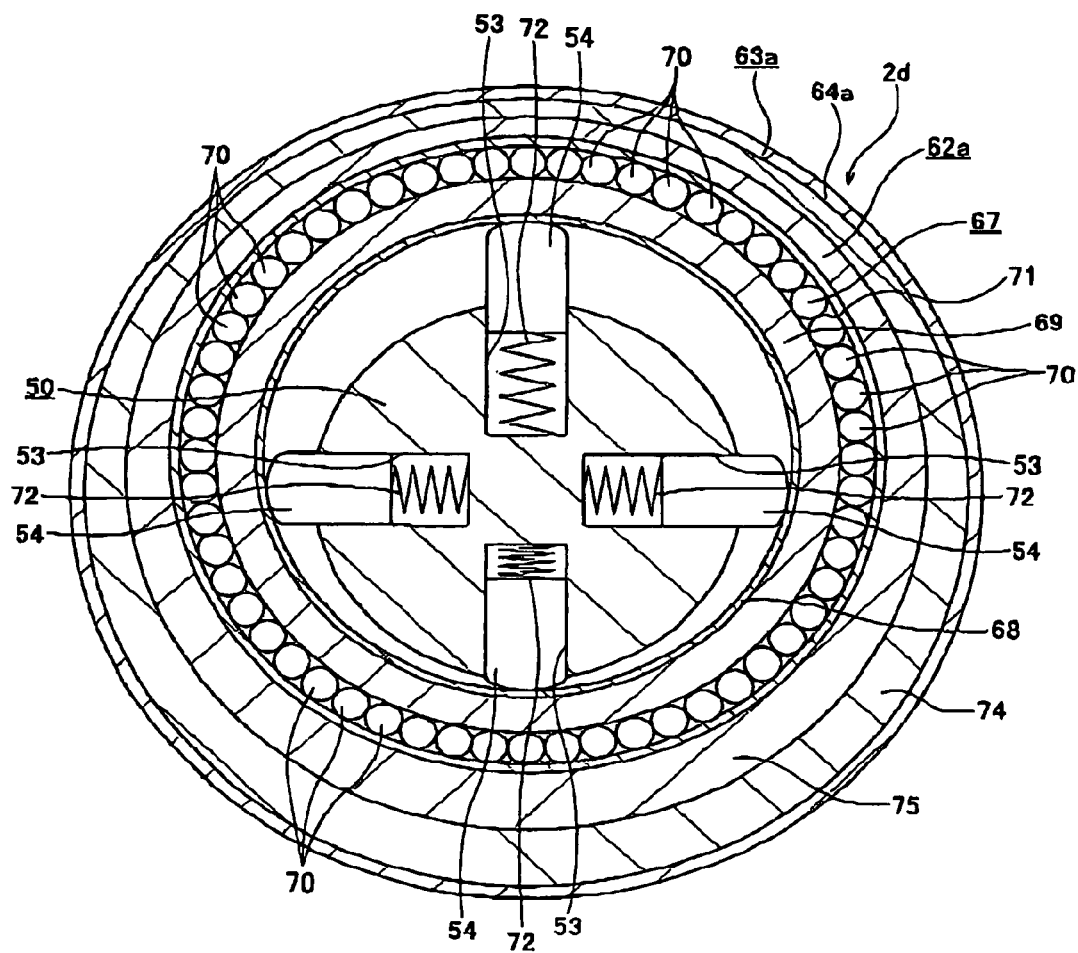
FIG. 16 is an enlarged view of section $\xi$-$\xi$ in FIG. 15.
Figure 17:
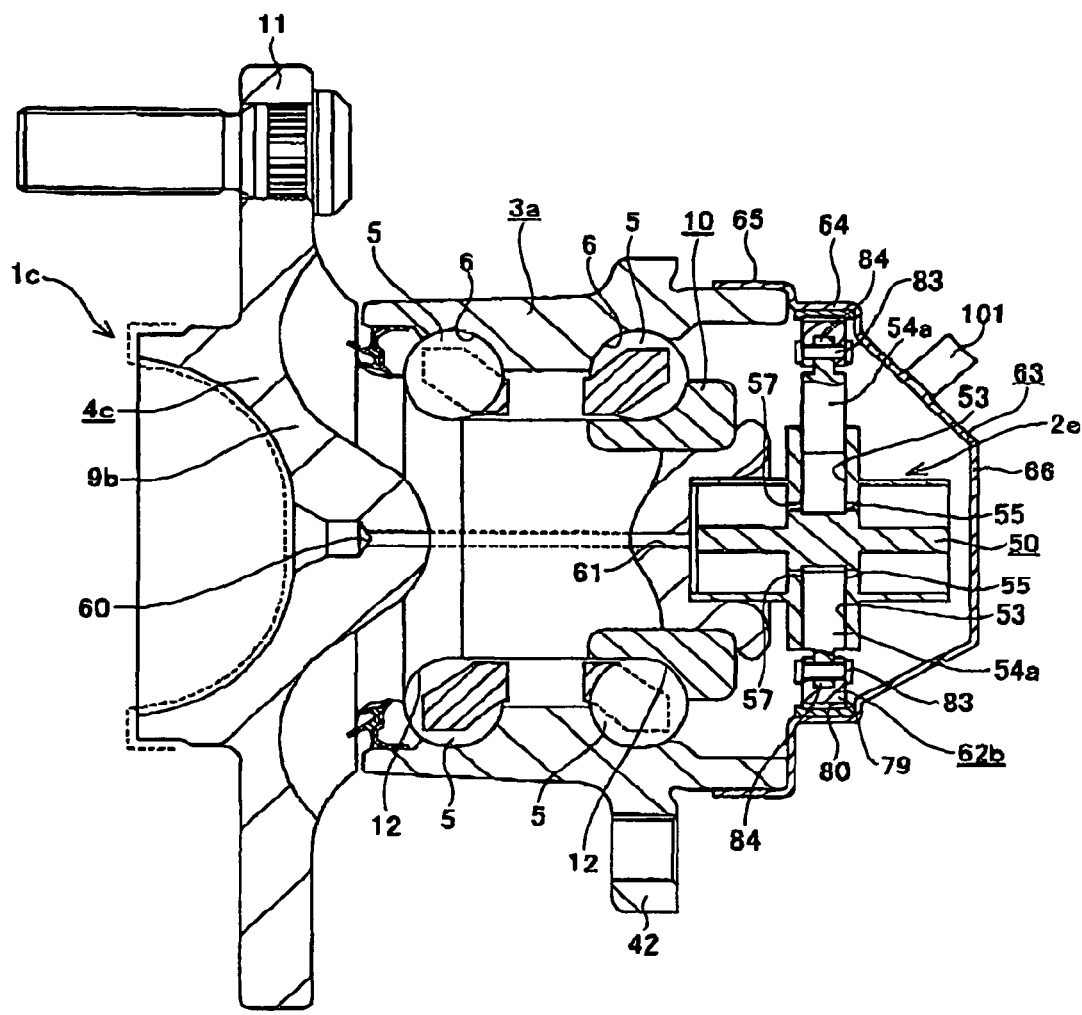
FIG. 17 is a cross-sectional view of a tenth example of the present invention.
Figure 18:
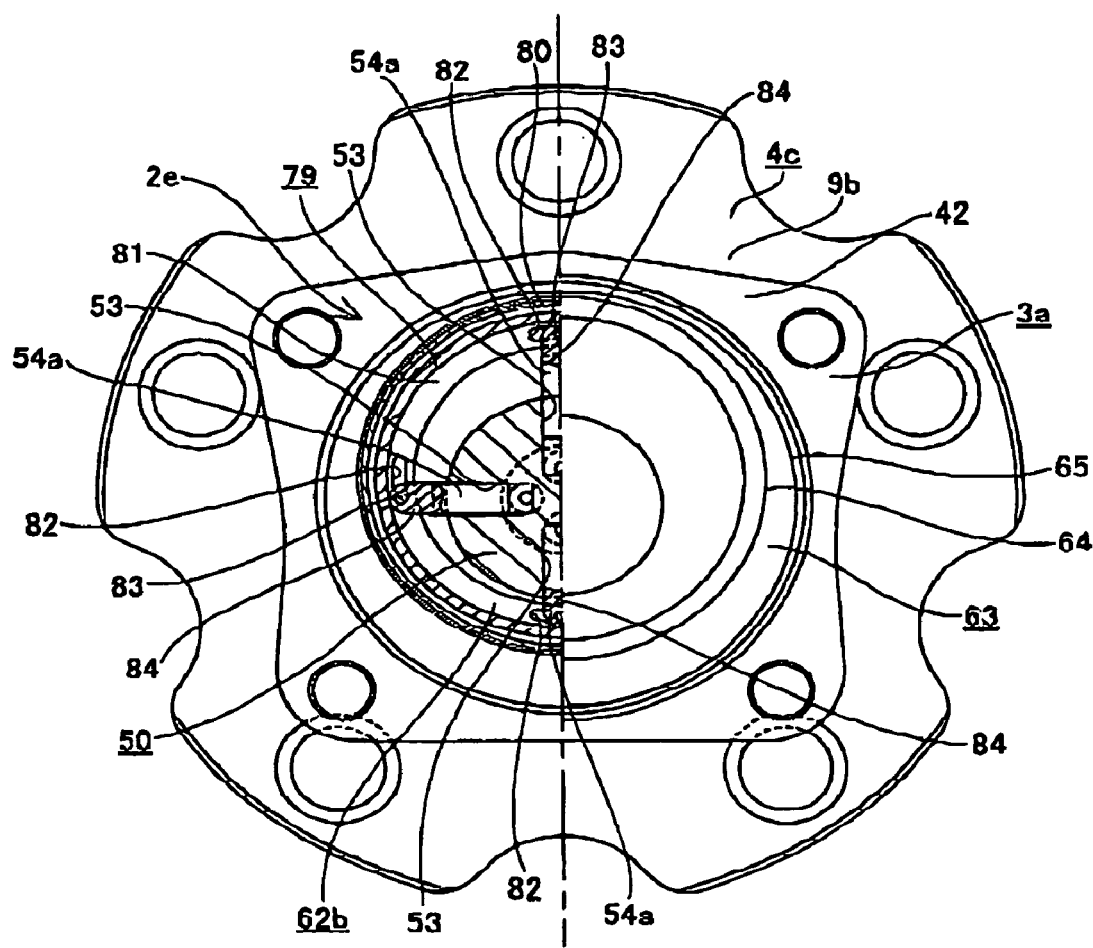
FIG. 18 is a partial cut-away view as seen from the right in FIG. 17.
Figure 19:
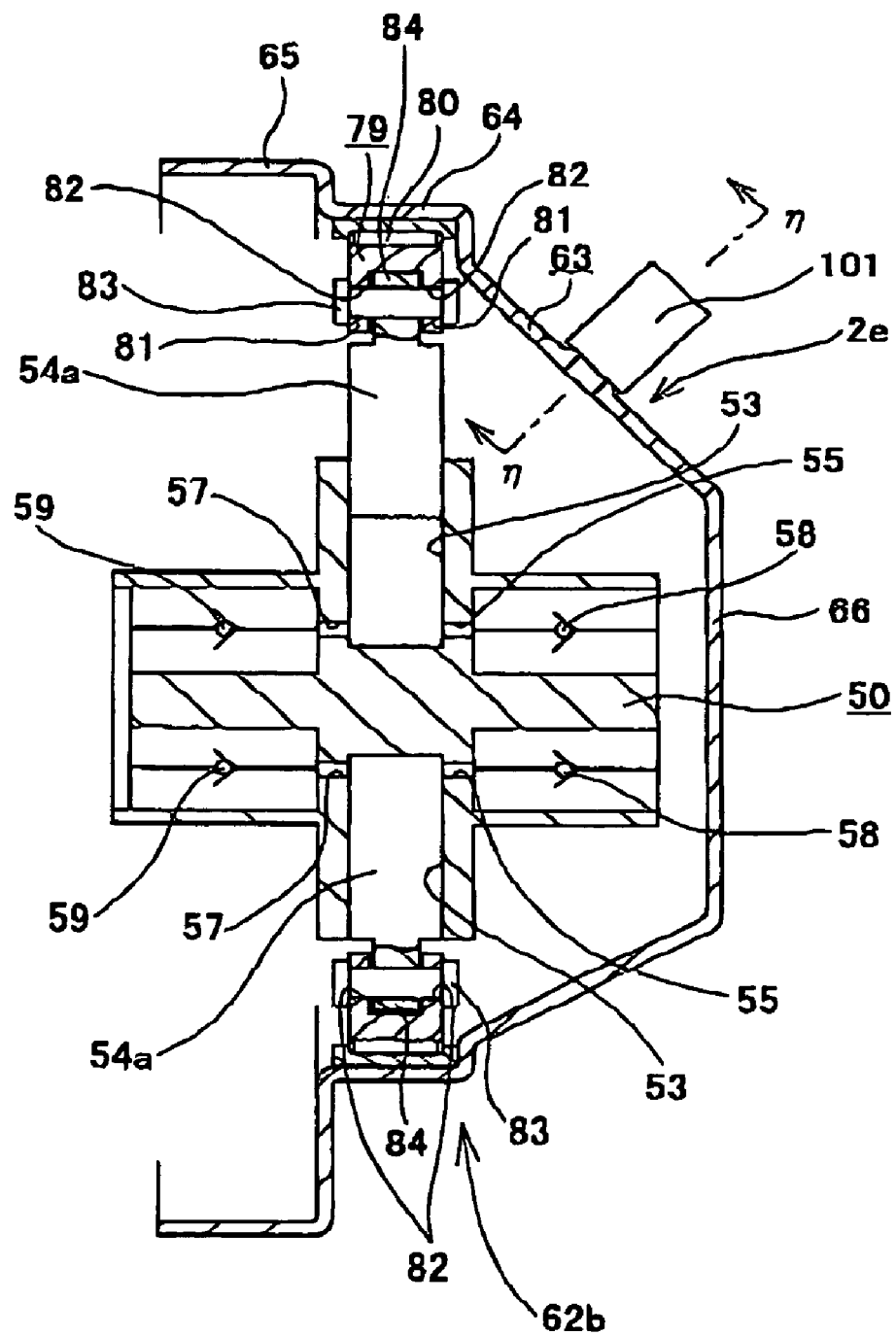
FIG. 19 is an enlarged view showing the air-compressor section of the tenth example.
Figure 20:
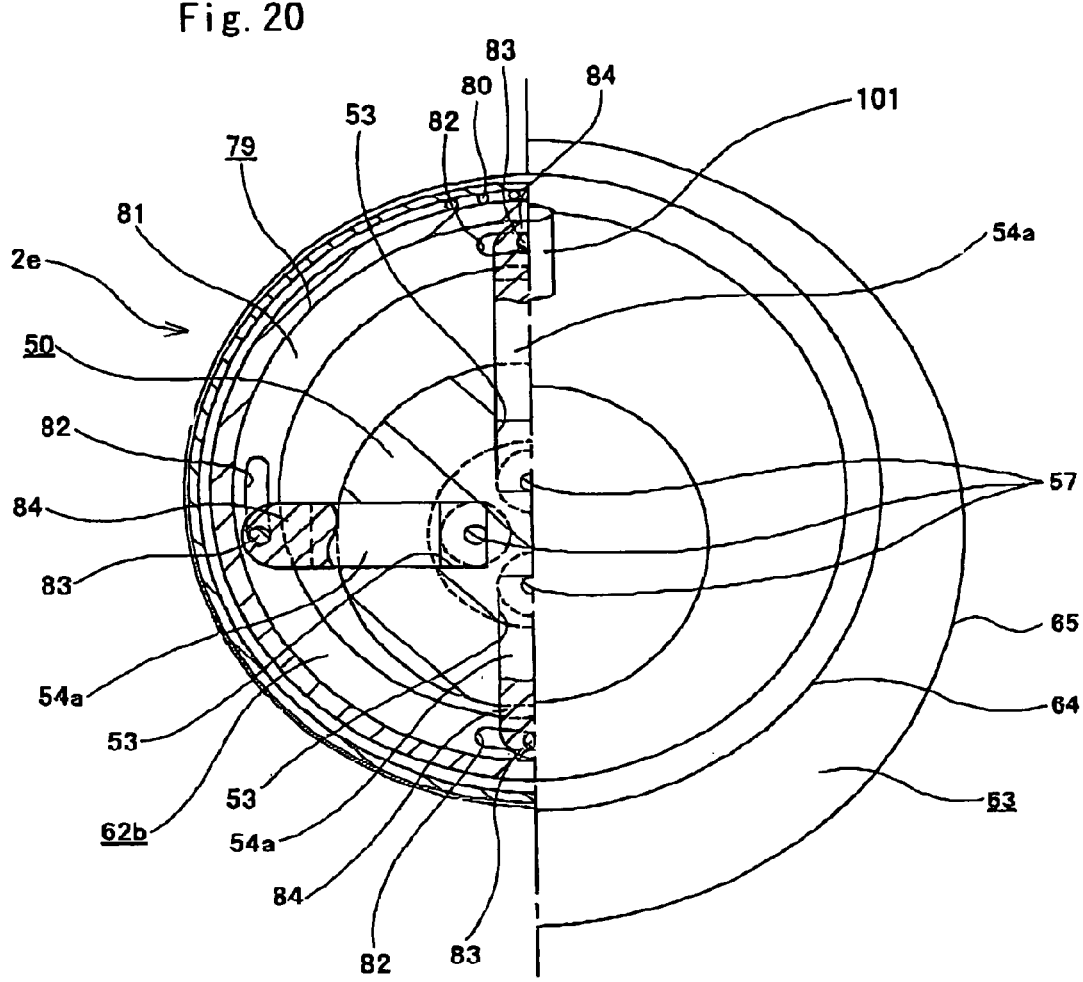
FIG. 20 is a partial cut-away view as seen from the right in FIG. 19.

FIGS. 15 and 16 show a ninth example of the present invention. In the case of this example, by making it possible to regulate the stroke of the plurality of pistons 54 of the reciprocating-piston air compressor 2d, the air compressor 2d becomes a variable-capacity type compressor. Therefore, in the case of this example, the cylindrical section 64a that is located in part of the cover 63a that covers the opening in the inside end in the axial direction of the outer ring 3a is concentric with the outer ring 3a and cylinder block 50. Also, there is an outer eccentric ring 74, inner eccentric ring 75, radial-needle bearing 67 and sliding bearing 68 located between the inner peripheral surface of the cylindrical section 64a and the base-end surface of the pistons 54 (outer side end surface in the radial direction of the cylinder block 50) and arranged in order from the inner peripheral surface of the cylindrical section 64a, or in other words from the outer side to the inner side in the radial direction of the cylinder block 50. The radial-needle bearing 67 is constructed by arranging a plurality of needles 70 between the inner peripheral surface of the outer ring 71 that is arranged on the outer-diameter side and the outer peripheral surface of the inner ring 69 that is arranged on the inner-diameter side.

Also, both the outer and inner eccentric rings 74, 75 are made from a non-corrosive material having the necessary lubricating properties such as a high-function resin, self-lubricating metal such as copper or copper alloy, or oil-containing metal such as sintered metal and formed into a circular ring shape. Moreover, in the case of both the outer and inner eccentric rings 74, 75 the center axis of the inner peripheral surface does not match the center axis of the outer peripheral surface, and the dimension of the thickness in the radial direction gradually changes in the circumferential direction. The amount of eccentricity of the center axes of both the inner and outer peripheral surfaces between both the outer and inner eccentric rings 74, 75 is the same. Also, of these, the inner diameter of the outer eccentric ring 74 is practically the same as the outer diameter of the inner eccentric ring 75, and the inner eccentric ring 75 is fitted into the outer eccentric ring 74 so that it can rotate with out vibration. Moreover, of the outer and inner eccentric rings 74, 75, the outer eccentric ring 74 is fastened to the inside of the cylindrical section 64a and does not rotate.

On the other hand, the outside end surface in the axial direction of the inner eccentric ring 75 protrudes further outward in the axial direction than the outside end surface in the axial direction of the outer eccentric ring 74, and a follower gear is formed around this protruding portion in the range of at least a little more than half the circumference of the outside end surface in the axial direction. This follower gear engages with a drive gear that is fastened to the output shaft of the drive motor (not shown in the figure) that is fastened to the cover 63a so that the inner eccentric ring 75 rotates at least half a rotation. In other words, the inner eccentric ring 75 can be adjusted between the state where the thickness distribution in the radial direction coincides with the outer eccentric ring 74 and the state where it is 180 degrees different. When the thickness distributions of both eccentric rings 74, 75 coincide, or in other words, when the portions where the thicknesses of both eccentric rings 74, 75 are the greatest coincide, the amount of eccentricity of the inner peripheral surface of the inner eccentric ring 75 with respect to the cylindrical section 64a becomes a maximum. On the other hand, when the thickness distributions of both eccentric rings 74, 75 differ by 180 degrees, or in other words, when the portion where the thickness of the outer eccentric ring 74 coincides with the portion where the thickness of the inner eccentric ring 75 is the smallest, the inner peripheral surface of the inner eccentric ring 75 becomes concentric with the cylindrical section 64a. It is possible to install an ultrasonic motor that contains a piezo element (a ring shaped sheet) between the surfaces of both eccentric rings 74, 75, and to regulate the phase between these eccentric rings 74, 75.

When the air compressor 2d discharges compressed air from the discharge port 60, the basic operation of the piston-drive mechanism 62a is the same as in the case of the eighth example described above. That is, the plurality of pistons 54 of the air compressor 2d move inside the cylinder holes 53 with a stroke based on the radial displacement of the inner ring 69 of the radial-needle bearing 67. Also, when operating in this way, the amount of stroke of the pistons 54 (amount of movement in the axial direction) is proportional to the amount of eccentricity of the inner peripheral surface of the inner eccentric ring 75 with respect to the cylindrical section 64a (become two times the amount of eccentricity). Therefore, by rotating the inner eccentric ring 75 to adjust the amount of eccentricity of the center axis of the inner peripheral surface of the inner eccentric ring 75 with respect to the center axis of the cylindrical section 64a (same as the center axis of the cylinder block 50), it is possible to adjust the amount of compressed air that the air compressor 2d discharges from the discharge port 60. When doing this, by matching the thickness distributions of both eccentric rings 74, 75, the discharge amount becomes the maximum, and when the thickness distributions of the eccentric rings 74, 75 differ by 180 degrees, the discharge amount becomes a minimum (zero).

When using the construction of this example, for example, an accumulator 76 and pressure switch 77 are installed in the middle of the air-intake tube 37 that connects to the discharge port 60. Also, the drive motor adjusts the phase in the rotational direction of the inner eccentric ring 75 based on a measurement signal from the pressure switch 77 and changes the discharge amount. For example, when based on the measurement signal it is determined that there is sufficient air pressure inside the tire, the discharge amount is set to a minimum, and the torque for rotating and driving the air compressor 2d is decreased (as close to zero as possible). On the other hand, when it is determined that the air pressure inside the tire is not sufficient, the discharge amount is increased. Except for the construction for changing the capacity, the other construction and function are the same as in the eighth example described above, so the same reference numbers are used for identical parts, and any redundant explanation is omitted.

Tenth Example

FIGS. 17 to 21 show a tenth example of the present invention. In this example, as in the case of the eighth example described above, on part of the cover 63 that is fastened to the inside end section in the axial direction of the outer ring 3a and covers the opening on the inside end in the axial direction of the outer ring 3a, in the portion adjacent to the inside in the axial direction of the inside end surface in the axial direction of the outer ring 3a, there is a cylindrical section 64 that is eccentric with respect to the cylinder block 50. Particularly, in this example, in order to construct the piston-drive mechanism 62b, an oscillating ring 79 is supported on the inner diameter side of the cylindrical section 64 by way of a radial-needle bearing 80 so that it can rotate freely, and is supported such that the center axis of this oscillating ring 79 is parallel with the center axis of the cylinder block 50. Also, the base end sections of the pistons 54a are engaged to a part of the oscillating ring 79, such that displacement in the radial direction of the oscillating ring 79 is substantially prevented, but the displacement in the circumferential direction is possible.

Therefore, in this example, the oscillating ring 79 is formed so that the inner side has an open cross section similar to the casing 24 in the first, section and fourth examples described above (see FIGS. 1, 2, 5 and 7), and inward facing flange-shaped support plate sections 81 are formed around the inner peripheral surface on both ends in the axial direction of the oscillating ring 79. Also, long holes 82 are formed in parts of these support plate sections 81 in the areas where they fit together with the base end sides of the pistons 54a (outside in the radial direction of the cylinder block 50). These long holes 82 are concentric with the oscillating ring 79 and are long in the circumferential direction of the oscillating ring 79. Also, the length of these long holes 82 is a little more than twice the amount of eccentricity of the cylindrical section 64 with respect to the outer ring 3a and cylinder block 50 (stroke of the pistons 54a) (by the amount of the outer-diameter of the middle section of the respective pins 83 that will be described later or more).

On the other hand, a connection-plate section 84 that can be loosely inserted between both support-plate sections 81 is formed on the base-end section of each of the pistons 54a. Also, both end sections of the pins 83 that pass through these connection-plate sections 84 are loosely fitted into the long holes 82 so that displacement in the lengthwise direction of the long holes 82 is possible. In this example, when the air compressor 2e is operating, the pins 83 move back and forth along the long holes 82 in the circumferential direction of the oscillating ring 79. Therefore, taking lubricating properties into consideration, it is preferable that the oscillating ring 79 and the pins 83 be a combination of steel and a copper alloy, or that a lubricating film such as DLC having excellent resistance to wear be formed on one of the surfaces.

In the case of the construction of this example described above, when the cylinder block 50 rotates together with the hub 4c as the vehicle moves, the oscillating ring 79 moves in the radial direction along the cylindrical section 64 while rotating together with the pistons 54a. Also, the pistons 54a are moved in the radial direction of the cylinder block 50 by way of the pins 83, and move back and forth inside the cylinder holes 53. As a result, as in the case of the eighth and ninth examples described above, air that is drawn in from the air-intake paths 55 is compressed inside each of the cylinder holes 53, after which it is fed to the discharge port 60 by way of the branch paths 57 and air-supply path 61.

When feeding compressed air in this way, the oscillating ring 79 and cylinder block 50 rotate at the same angular velocity, and the direction of eccentricity of each of the center axes changes constantly. Also, while the pistons 54a rotate together with the cylinder block 50 (revolve around the center axis of the cylinder block 50), they displace in the radial direction of the cylinder block 50. Therefore, as can be clearly seen from FIG. 20, the phase in the rotational direction of the pins 83, which are supported by the base-end sections of the pistons 54a, and the oscillating ring 79 constantly changes. In this example, the change in phase is absorbed by the pins 83 moving back and forth along the length of the long holes 82.

Figure 21:
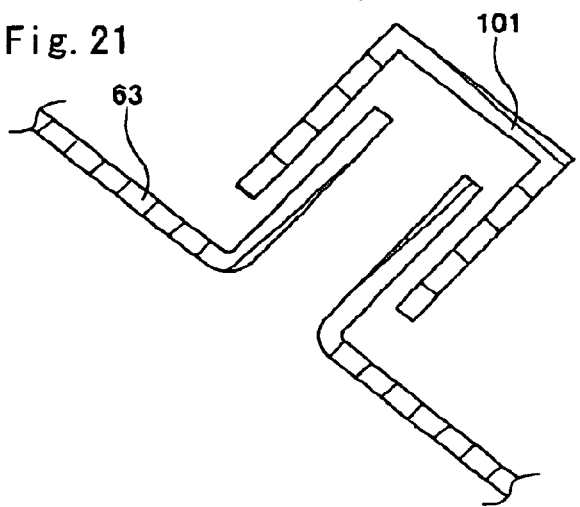
FIG. 21 is an enlarged view of section $\eta$-$\eta$ in FIG. 19.

In this example, a ventilator 101 is installed as shown in FIG. 21 over the air-intake opening in the cover 63 so that air is taken in after foreign matter such as rainwater and the like has been removed.

The other construction and function of this example are the same as in the eighth example described above, so the same reference numbers are used for identical parts, and any redundant explanation is omitted.

Eleventh Example

Figure 22:
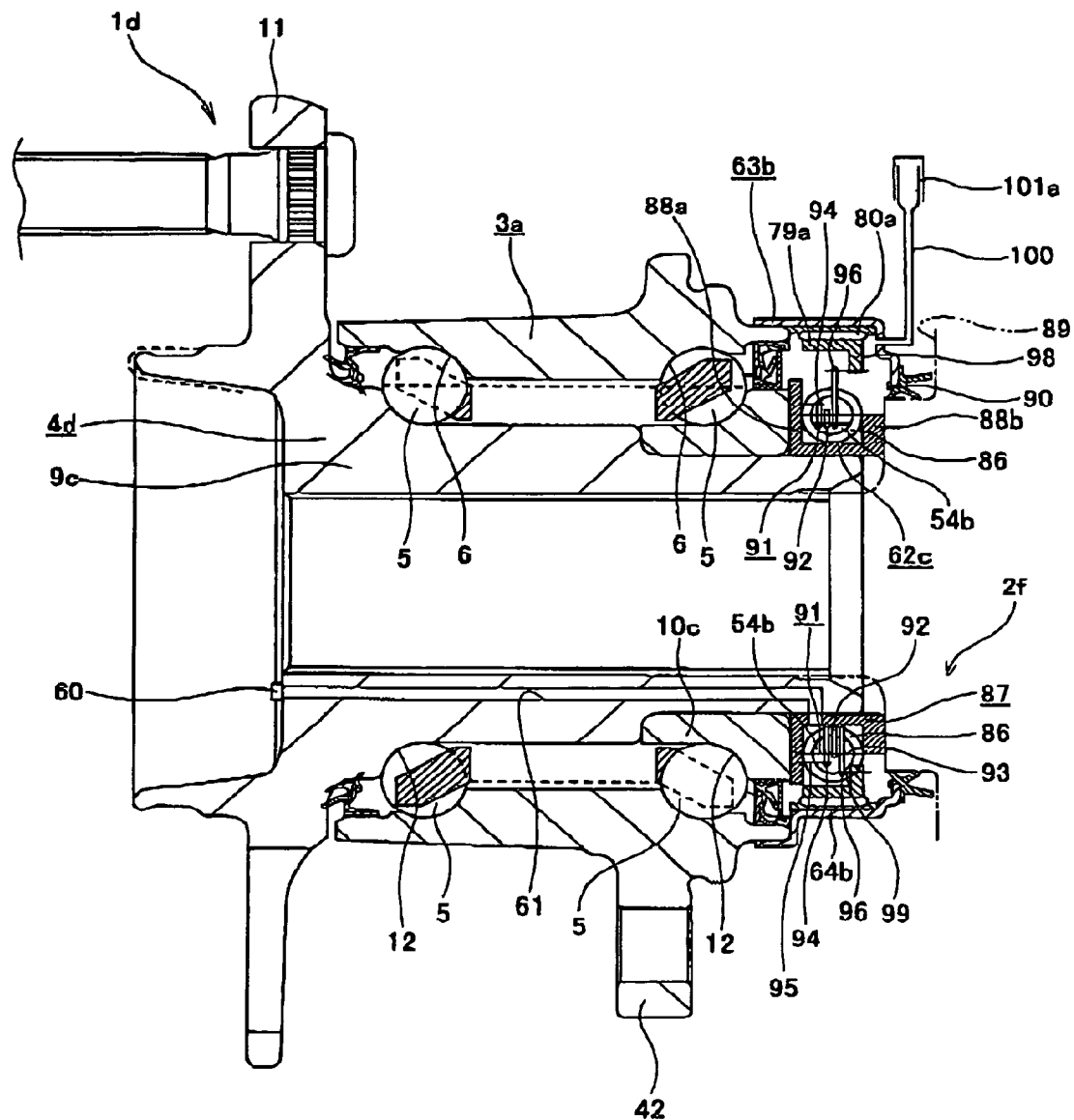
FIG. 22 is a cross-sectional view of an eleventh example of the present invention.
Figure 23:
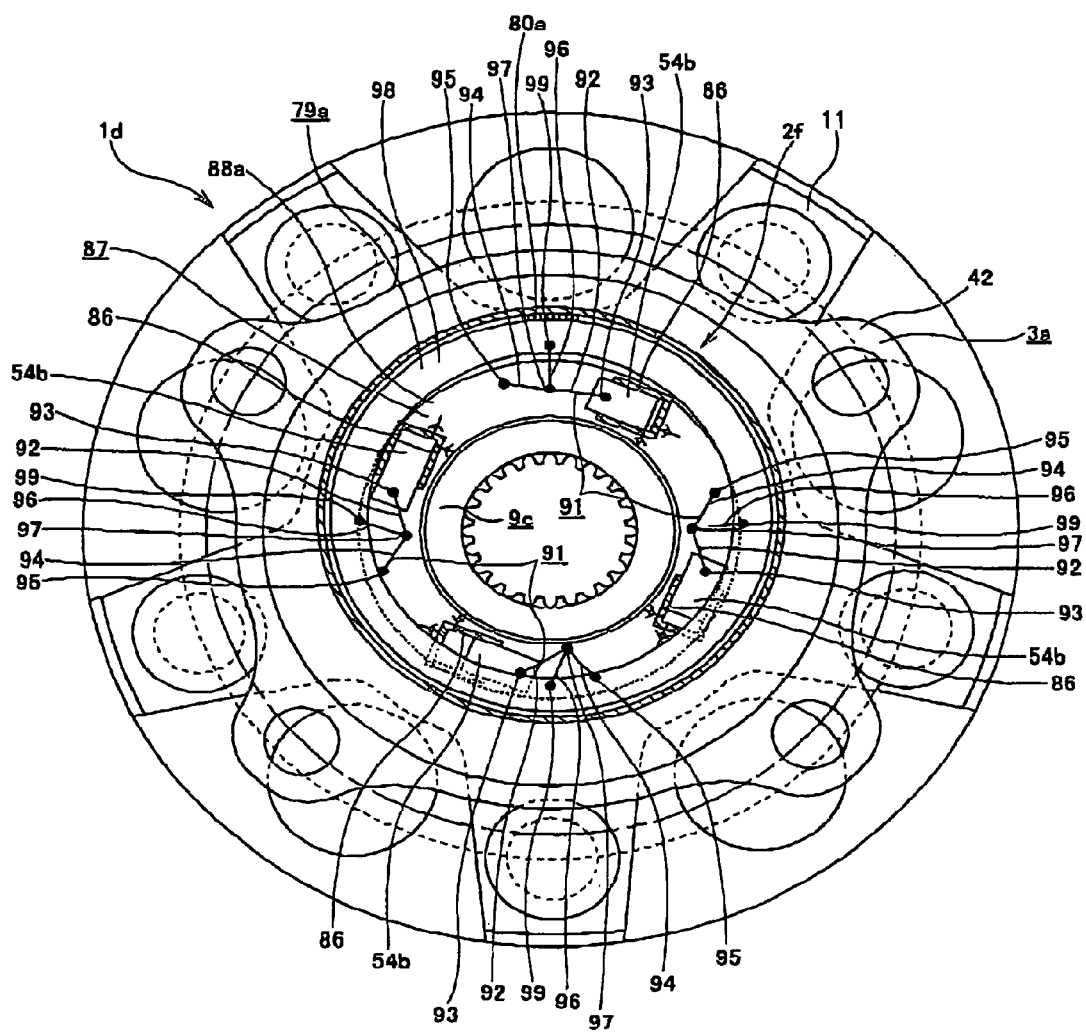
FIG. 23 is an enlarged view as seen from the right in FIG. 22 in which the cover is omitted and the cylinder is cut.
Figure 24:
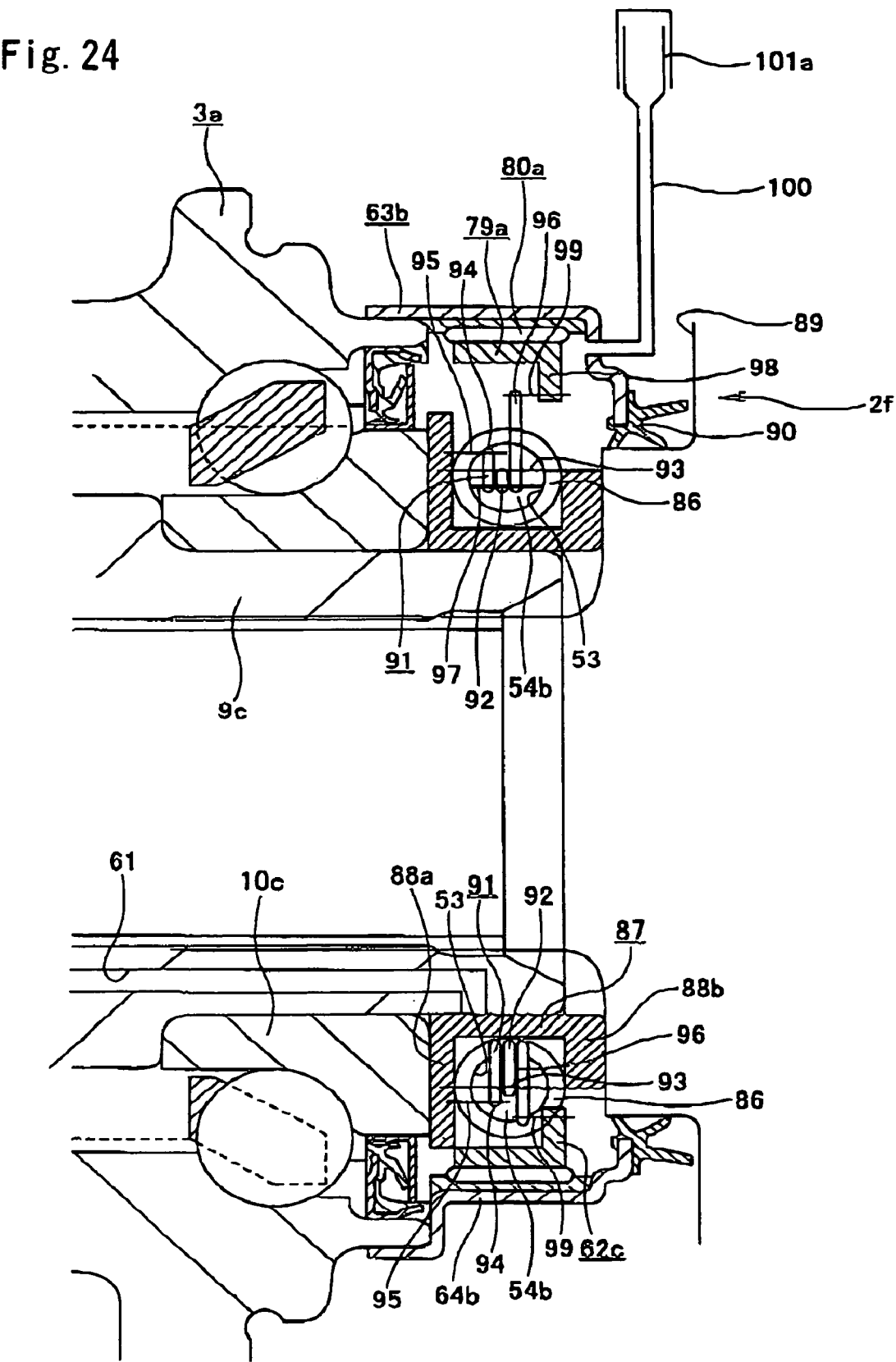
FIG. 24 is an enlarged cross-sectional view of the piston-drive apparatus as seen from the direction as FIG. 22.
Figure 25:
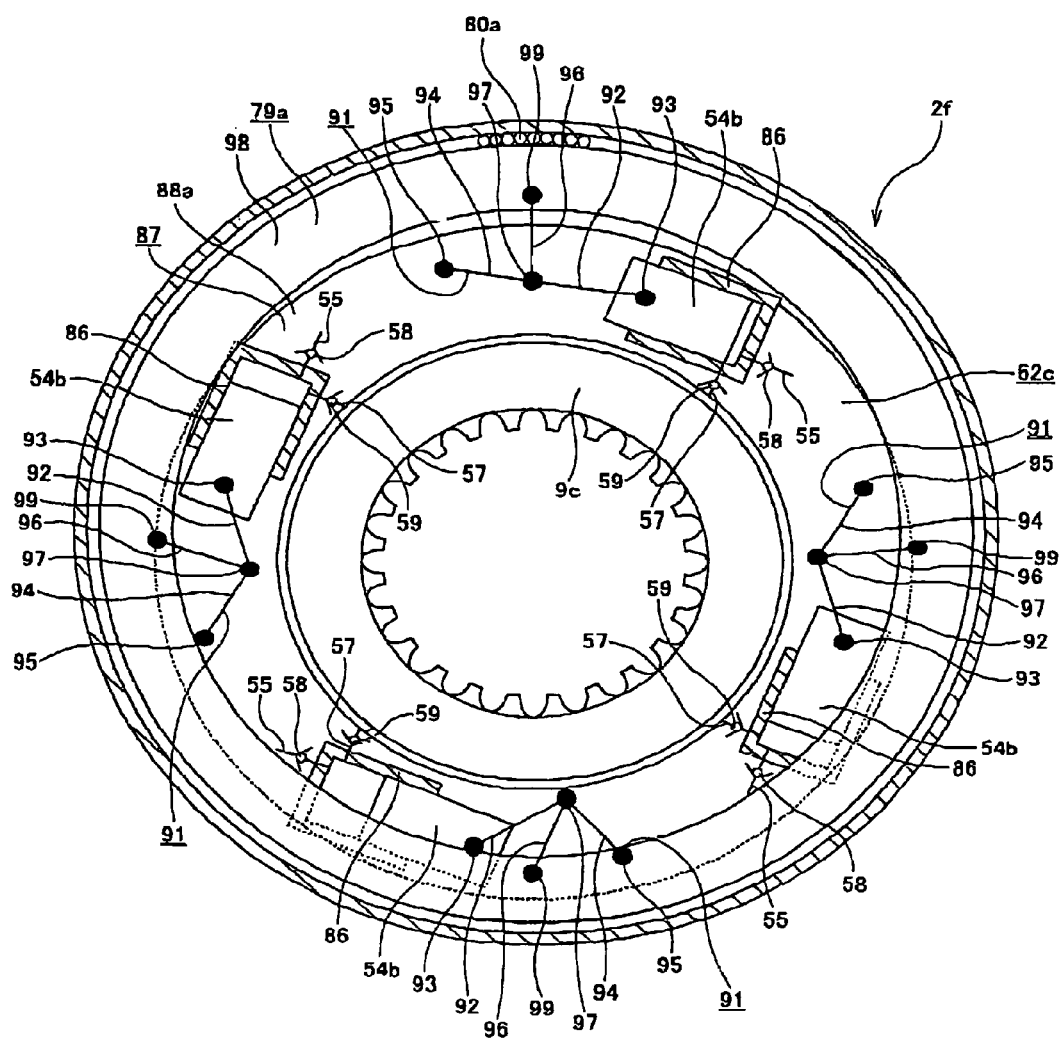
FIG. 25 is a view as seen from the right in FIG. 24 in which part is omitted and cut way.

FIGS. 22 to 25 show an eleventh example of the invention. In the construction of any of the examples 8 to 10 described above, construction was employed in which the cylinder block 50 (for example see FIG. 13) is connected and fastened to the inside end section in the axial direction of the hub 4c so that it is concentric with the hub 4c. Therefore, while being appropriate for a wheel-supporting rolling bearing unit 1c for an undriven wheel (see FIGS. 13, 15 and 17), it is not appropriate for drive wheels. The reason for this is that the cylinder block 50 becomes an obstruction and it is not possible to connect the hub to the drive shaft of the constant-velocity joint. When using the wheel-supporting rolling bearing unit 1d as shown in FIG. 22, in order to connect the hub to the drive shaft of the constant-velocity joint 89, it is necessary to leave space at the inside end section of the hub 4d for the drive shaft to pass through, so it is not possible to install the cylinder block 50.

In the case of this example which takes into consideration this problem, in order to construct a reciprocating air compressor 2f, a plurality of independent cylinders 86 are supported by and fastened to a plurality of locations that are evenly spaced in the circumferential direction around the inside end section in the axial direction of the hub 4d so that the center axis of each is at an angle with respect to the radial direction of the hub 4d (tangential direction or near tangential direction). Therefore, in the case of this example, a cylinder holder 87 is fastened around the inside end section in the axial direction of the hub body 9c of the hub 4d in the area that protrudes inward in the axial direction further than the surface on the inside end in the axial direction of the inner ring 10c. This cylinder holder 87 is formed entirely into a circular ring shape and a pair of outward facing flange-shaped inner rim sections 88a, 88b are formed on both end sections in the axial direction of the outer peripheral surface. Each of the cylinders 86 is held between these inner rim sections 88a, 88b and supported by and fastened around the middle section in the axial direction of the cylinder holder 87.

On the other hand, the outside end section in the axial direction of the circular ring shaped cover 63b is fitted and fastened with interference fit onto the inside end section in the axial direction of the outer ring 3a. This cover 63b serves the role of covering the space between the inner peripheral surface around the inside end section in the axial direction of the outer ring 3a and the outer peripheral surface of the constant-velocity joint 89 that is fastened to the hub 4d. Therefore, there is a seal lip 90 around the inner edge section of the cover 63b that comes in sliding contact with the outer peripheral surface of the constant-velocity joint 89. In this example as well, as in the case of the eighth and tenth examples described above, there is a cylindrical section 64b that is eccentric with respect to the outer ring 3a and that is located on part of the cover 63b in the area adjacent to the inside in the axial direction of the inside-end surface in the axial direction of the outer ring 3a. Also, an oscillating ring 79a is located on the inner side of the cylindrical section 64b so that it can rotate freely by way of a radial-needle bearing 80a. In this state, the center axis of the oscillating ring 79a and the center axis of the outer ring 3a are parallel with each other.

In this example, the oscillating movement of the oscillating ring 79a causes the pistons 54b, which are installed inside the cylinders 86 in airtight manner, to move back and forth in the axial direction by way of toggle mechanisms 91. In order to construct these toggle mechanisms 91, one end of a first link arm 92 is supported by the base-end section of each of the pistons 54b (end on the side that protrudes from the opening section of the each cylinder 86) by a first pivot 93 that is parallel with the center axis of the outer ring 3a and hub 4d so that it can freely oscillate back and forth. Also, one end of a second link arm 94 is supported by the cylinder holder 87, which rotates together with the hub 4d, in the part that faces the opening section of the cylinders 86 on the part of the inside surface in the axial direction of the inner rim section 88a that is on the outside in the axial direction by way of a second pivot 95 that is parallel with the first pivot 93 so that it can oscillate freely back and forth. The other end sections of the first and second link arms 92, 94 and one end section of a third link arm 96 are connected by a third pivot 97 that is parallel with the first and second pivots 93, 95 so that they can freely oscillate back and forth. Furthermore, the other end of the third link arm 96 is connected to the outside surface in the axial direction of an inward facing flange-shaped outer rim section 98 that is formed on the inside end section in the axial direction of the inner peripheral surface of the oscillating ring 79a by a fourth pivot 99 that is parallel to the first through third pivots 93, 95, 97 so that it can freely oscillate back and forth.

A piston-drive mechanism 62c that is constructed as described above from an oscillating ring 79a and toggle mechanisms 91 moves the pistons 54b back and forth in the axial direction of the cylinders 86 as the cylinders 86 rotate (revolve around the center axis of the hub 4d) as described below.

In other words, in the case of this example, when the cylinders 86 revolve together with the rotation of the hub 4d as the vehicle moves, the oscillating ring 79a rotates together with the pistons 54b and moves in the radial direction following the cylindrical section 64b. Also, each of the fourth pivots 99 are moved in the radial direction of the cylinder holder 87 that supports and fastens to the cylinders 86, which moves each of the third pivots 97 in the radial direction of the cylinder holder 87 by way of the third link arms 96. When these third pivots 97 move in the radial direction of the cylinder holder 87, the positional relationship between the first and second link arms 92, 94 repeats between the linear state shown at the top of FIGS. 23 and 25 and the bent state similarly shown at the bottom of the same figures. The positional relationship between the second pivot 95 and the cylinders 86 does not change regardless of the rotation of the cylinder holder 87. Therefore, the pistons 54b move in and out of the cylinders 86 due to change in the positional relationship between the first and second link arms 92, 94. As a result, similar to the case of the eighth through tenth examples described above, air that is drawn in from the air-intake paths 55 is compressed inside the cylinders 86, after which it is fed through the branch paths 57 and air-supply path 61 to the discharge port 60.

In this example, a ventilator 101a is installed on the top end section of the air-intake tube 100 of which the bottom end section is connected to the cover 63b. This ventilator 101a is placed as a sufficiently high location so that water cannot get inside the cylinders 86 even when the vehicle is traveling through water such as deep water puddles or rivers. In other words, when considering driving off road as in the case of a 4WD vehicle, the ventilator 101a is such that it prevents water that is a non-compressible fluid from being taken into the cylinders 86.

The construction and function of the air-intake paths 55 and air-supply path 61 are basically the same as in the eighth through tenth examples described above, so the same reference numbers are used for identical parts, and any redundant explanation is omitted.

What is claimed is:
1. A wheel-supporting rolling bearing unit with air compressor comprising:
an outer ring having a double row of outer raceways formed around an inner peripheral surface thereof, the outer ring being supported by and being fastened to a suspension apparatus and does not rotate during use;

a hub comprising a hub body and an inner ring fastened to an inside end section in an axial direction of the hub body by a crimped section formed on the inside end section in the axial direction of the hub, and a double row of inner raceways formed around an outer peripheral surface thereof, the wheel being fastened to the hub, the wheel and the hub rotating together during use and the hub body having an air-supply path running through the hub body and feeding compressed air that is discharged from the air compressor toward a tire of the wheel;

a plurality of rolling elements located between the inner raceways and outer raceways of each row;

a cover fastened to an inside end section in an axial direction of the outer ring and comprising an outer cylindrical section fitted onto an inside end of the outer ring, a bottom plate section and a cylindrical section located between the outer cylindrical section and the bottom plate section, the bottom plate section and the cylindrical section covering an opening section of the inside end in the axial direction of the outer ring;

wherein the air compressor comprises a cylinder block that is connected and fastened to the inside end section in an axial direction of the hub so that the cylinder block is concentric with the hub;

a plurality of cylinder holes formed at a plurality of locations evenly spaced in a circumferential direction of the cylinder block so that the plurality of cylinder block are oriented in a radial direction of the cylinder block and open on an outer peripheral surface of the cylinder block;

a plurality of pistons fitted into the cylinders in airtight manner and being movable inside the cylinders in the radial direction of the cylinder block;

a piston-drive mechanism of which at least part of the components are located between the pistons and a member fastened to the outer ring and is such that it moves the pistons back and forth in the radial direction of the cylinder block as the cylinder block rotates; and an air-intake path that is located between the outside space and the back section of the cylinder holes and that draws in air from an outside space to a back section of the cylinder holes when the pistons move outward in the radial direction of the cylinder block;

a feed path located between the air-supply path of the hub body and the back section of the cylinder holes, and feeding the compressed air from the back section of the cylinder holes to the discharge port when the pistons move inward in the radial direction of the cylinder block; and an outside half of the cylinder block in an axial direction thereof is fitted into a circular hole that is formed in the inside end of the axial direction of the hub body, wherein the portion fastened to the outer ring and is between the pistons where part of the components of the piston-drive mechanism are installed is the cover and the air compressor is placed in an inner space surrounded by the inside end in the axial direction of the hub and the cylindrical section and the bottom plate section of the cover, and inside the circular hole of the hub body.

2. The wheel-supporting rolling bearing unit with air compressor of claim 1;

wherein an independent air-intake path is located for each of the cylinder holes, and an air-intake check valve is located in the middle of each of the air-intake paths so that the air-intakes check valves are in line with the air-intake paths and allow air to pass only in the direction from the outside space toward the cylinder holes; and wherein an independent upstream portion of the feed path is provided for each of the cylinder holes, the independent upstream portions come together at a downstream portion and the downstream portion flows to a single discharge port, and wherein a discharge check valve is located in the middle of each of the upstream portions of the feed path so that the discharge check valves are in line with the upstream portions and allow compressed air to flow only in the direction from the cylinder holes toward the discharge port.

3. The wheel-supporting roller-bearing unit with air compressor of claim 2 wherein the portion fastened to the outer ring and is between the pistons where part of the components of the piston-drive mechanism are installed is a cover that is fastened to the inside end section in the axial direction of the outer ring and covers the opening section on the inside end in the axial direction of the outer ring; wherein a cylindrical section that is eccentric with respect to the outer ring and the cylinder block is located on a part of the cover that is adjacent to the inside in the axial direction of the inside end surface in the axial direction of the outer ring, an inner peripheral surface of the cylindrical section and base end surfaces of the pistons, which are the end surfaces on the outer side in the radial direction of the outer ring and cylinder block are engaged, by way of a bearing, such that formed is a pushing mechanism that pushes the pistons inward in the radial direction of the cylinder block as the cylinder block rotates; and wherein the remaining components of the piston-drive mechanism being compression springs that are located between the tip-end surfaces of the pistons, which are the end surfaces on the inner side in the radial direction of the cylinder block, and the back end surfaces of the cylinder holes, apply an elastic force on the pistons in the direction that moves the pistons outward in the radial direction of the cylinder block.

4. The wheel-supporting roller-bearing unit with air compressor of claim 3 wherein together with placing a cylindrical member between the inner peripheral surface of the cylindrical section located in the cover and the base end surfaces of the pistons, a radial-needle bearing is located between the inner peripheral surface of the cylindrical section and the outer peripheral surface of the cylindrical member, and a sliding bearing is located between the inner peripheral surface of the cylindrical member and the base-end surfaces of the pistons.

5. The wheel-supporting rolling bearing unit with air compressor of claim 1;

wherein the portion fastened to the outer ring and is between the pistons where the components of the piston-drive mechanism are installed is a cover that is fastened to the inside end section in the axial direction of the outer ring and covers the opening section on the inside end in the axial direction of the outer ring;

wherein a cylindrical section that is eccentric with respect to the outer ring and cylinder block is located on the part of the cover that is adjacent to the inside in the axial direction of the inside end surface in the axial direction of the outer ring, an oscillating ring is supported on the inner side of this cylindrical section so that the center axis of the oscillating ring is parallel with the center ring of the cylinder block and is such that it can rotate freely with respect to the cylindrical section; the portions of the base-end sections of the pistons that protrude outward in the radial direction from the outer peripheral surface of the cylinder block are engaged with part of the oscillating ring so that they are essentially prevented from moving in the radial direction of the oscillating ring, but are capable of moving in the circumferential direction thereof.

6. The wheel-supporting rolling-bearing unit with air compressor of claim 5 wherein a radial-needle bearing is located between the inner peripheral surface of the cylindrical section and the outer peripheral surface of the oscillating ring, arc-shaped long holes are located in part of the oscillating ring in the portion that faces the base end sides of the pistons and are such that they are long in the circumferential direction of the oscillating ring and concentric with the oscillating ring, pins that are parallel with the center axis of the oscillating ring are located in the base-end sections of the pistons; and the pins are fitted in the long holes so that they can move in the lengthwise direction of the long holes.

7. The wheel-supporting roller-bearing unit with air compressor of claim 3 wherein the cover covers the entire opening on the inside end in the axial direction of the outer ring, an intake opening is located on part of the cover for drawing in air from the outside space into the cover, and at least an air filter or a ventilator is located in the intake opening.

8. The wheel-supporting roller-bearing unit with air compressor of claim 5 wherein the cover covers the entire opening on the inside end in the axial direction of the outer ring, an intake opening is located on part of the cover for drawing in air from the outside space into the cover, and at least an air filter or a ventilator is located in the intake opening.

* * * * *